United States Patent
Shima

(10) Patent No.: US 7,443,884 B2
(45) Date of Patent: Oct. 28, 2008

(54) ELECTRONIC DATA TRANSMISSION AND RECEPTION SYSTEM

(75) Inventor: Shigeyoshi Shima, Minato-ku (JP)

(73) Assignee: NEC Corporation, Tokyo (JP)

( * ) Notice: Subject to any disclaimer, the term of this patent is extended or adjusted under 35 U.S.C. 154(b) by 781 days.

(21) Appl. No.: 10/671,834

(22) Filed: Sep. 29, 2003

(65) Prior Publication Data

US 2004/0066797 A1 Apr. 8, 2004

(30) Foreign Application Priority Data

Oct. 2, 2002 (JP) ............................. 2002-290387

(51) Int. Cl.
 *H04L 9/00* (2006.01)
(52) U.S. Cl. .................. 370/474; 370/401; 713/153; 713/170
(58) Field of Classification Search ............ 370/230, 370/252, 352, 355, 356, 389, 392, 395.1, 370/474, 401; 713/153, 160, 161, 170, 176, 713/168
See application file for complete search history.

(56) References Cited

U.S. PATENT DOCUMENTS

| | | | | |
|---|---|---|---|---|
| 5,511,122 | A | * | 4/1996 | Atkinson ..................... 713/153 |
| 6,009,528 | A | * | 12/1999 | Teraoka ........................ 726/22 |
| 6,092,191 | A | * | 7/2000 | Shimbo et al. ............... 713/153 |
| 6,760,444 | B1 | * | 7/2004 | Leung ......................... 380/270 |
| 7,133,407 | B2 | * | 11/2006 | Jinzaki et al. .......... 370/395.64 |
| 2007/0088950 | A1 | * | 4/2007 | Wheeler et al. ............. 713/170 |

FOREIGN PATENT DOCUMENTS

| | | |
|---|---|---|
| JP | 7-162451 A | 6/1995 |
| JP | 10-105058 A | 4/1998 |
| JP | 2000-57112 A | 2/2000 |
| JP | 2000-78235 A | 3/2000 |
| JP | 2000-078235 A | 3/2000 |
| JP | 2000-99421 A | 4/2000 |
| JP | 2000-183866 A | 6/2000 |
| JP | 2001-51951 A | 2/2001 |
| JP | 2001-331105 A | 11/2001 |
| JP | 2002-007288 A | 1/2002 |
| JP | 2002-183491 A | 6/2002 |
| JP | 2003-36023 A | 2/2003 |

* cited by examiner

*Primary Examiner*—Ricky Ngo
*Assistant Examiner*—Pao Sinkantarakorn
(74) *Attorney, Agent, or Firm*—Sughrue Mion, PLLC

(57) ABSTRACT

An electronic data transmission and reception system has n apparatus, a transmitting apparatus, and a receiving apparatus which are connected to a network. The transmitting apparatus transmits first electronic data to a first apparatus. The receiving apparatus receives (n+1)th electronic data from a nth apparatus. A jth (j is an integer satisfying $1 \leq j \leq n$) apparatus generates (j+1)th electronic data which comprise jth electronic data with a signature assigned thereto for identifying the jth apparatus, and transmits the (j+1) electronic data to a (j+1)th apparatus. When j is n, an (n+1)th apparatus corresponds to the receiving apparatus. The electronic data transmission and reception system guarantees the first electronic data transmitted by the transmitting apparatus until the first electronic data are received by the receiving apparatus, because of signatures that are generated until the (j+1) electronic data are generated.

25 Claims, 13 Drawing Sheets

ELECTRONIC DATA TRANSMISSION AND RECEPTION SYSTEM

BACKGROUND OF THE INVENTION

1. Field of the Invention

The present invention relates to an electronic data transmission and reception system, and more particularly to an electronic data transmission and reception system for confirming whether electronic data transmitted from a transmitting apparatus have been received by a receiving apparatus or not.

2. Description of the Related Art

There are known systems for transmitting electronic data or electronic texts (e.g., see patent documents 1, 2, 3, 4 below).

In a system wherein a transmitting apparatus transmits electronic data via a relay device to a receiving apparatus, when the transmitting apparatus transmits electronic data to the receiving apparatus, a sender who uses the transmitting apparatus is required to communicate with the relay device from the transmitting apparatus and collect a log from the relay device in order to confirm whether the electronic data transmitted from the transmitting apparatus have been received by the receiving apparatus or not. There has been desired in the art a system for guaranteeing electronic data transmitted from a transmitting apparatus until they are received by a receiving apparatus.

Patent document 1:
 Japanese laid-open patent publication No. 2000-78235;
Patent document 2:
 Japanese laid-open patent publication No. 2000-183866;
Patent document 3:
 Japanese laid-open patent publication No. 2002-7288; and
Patent document 4:
 Japanese laid-open patent publication No. 2002-183491.

SUMMARY OF THE INVENTION

It is an object of the present invention to provide an electronic data transmission and reception system for guaranteeing electronic data transmitted from a transmitting apparatus until they are received by a receiving apparatus.

Another object of the present invention is to provide an electronic data transmission and reception system which is capable of verifying a route along which electronic data are received by a receiving apparatus.

Still another object of the present invention is to provide an electronic data transmission and reception system which is capable of detecting a falsification of electronic data.

Yet another object of the present invention is to provide an electronic data transmission and reception system which protects itself against illegal access by a hacker.

Means for achieving the above objects of the present invention will be described below using reference numerals and characters that appear in the detailed description of the embodiment of the present invention. These reference numerals and characters are added only to clarify the relationship between the description of claims and the description of the embodiment of the present invention, and should not be used in the interpretation of the scope of claims.

An electronic data transmission and reception system according to the present invention comprises n first through nth (n is an integer of 2 or greater) apparatus [5-1 through 5-n], a transmitting apparatus [1], and a receiving apparatus [2]. The n apparatus [5-1 through 5-n], the transmitting apparatus [1], and the receiving apparatus [2] are connected to a network [100]. The transmitting apparatus [1] transmits first electronic data to the first apparatus [5-1]. The receiving apparatus [2] receives (n+1)th electronic data from the nth apparatus [5-n]. A jth (j is an integer satisfying $1 \leq j \leq n$) apparatus generates (j+1)th electronic data which comprise jth electronic data with a signature assigned thereto for identifying the jth apparatus, and transmits the (j+1) electronic data to a (j+1)th apparatus. When j is n, an (n+1)th apparatus corresponds to the receiving apparatus [2].

The electronic data may, for example, be electronic mail containing a document regarding a business between parties, with an image or images possibly attached to the electronic mail. Alternatively, the electric mail may be financial electronic data or civilian electronic data instead of electronic data regarding a business between parties.

With the electronic data transmission and reception system according to the present invention, because of signatures that are generated until the (j+1)th electronic data are generated, the sender who has transmitted the first electronic document with the transmitting apparatus [1] is unable to repudiate that the sender has transmitted the first electronic document (transmission denial). Consequently, the electronic data transmission and reception system according to the present invention guarantees the first electronic data transmitted by the transmitting apparatus [1] until the first electronic data are received by the receiving apparatus [2].

In the electronic data transmission and reception system according to the present invention, if the jth apparatus is the first apparatus [5-1], then the transmitting apparatus [1] transmits the first electronic data and a sender authenticator which authenticates the transmission of the first electronic data, to the first apparatus [5-1], and the first apparatus generates second electronic data which comprise the first electronic data and the sender authenticator with a signature of the first apparatus [5-1] assigned thereto, and transmits the second electronic data to a second apparatus [5-2].

With the electronic data transmission and reception system according to the present invention, because of the sender authenticator corresponding to the signature of the transmitting apparatus [1] and signatures assigned until the (j+1)th electronic data are generated, the sender who has transmitted the first electronic document with the transmitting apparatus [1] is unable to repudiate that the sender has transmitted the first electronic document (transmission denial). Consequently, the electronic data transmission and reception system according to the present invention guarantees the first electronic data transmitted by the transmitting apparatus [1] until the first electronic data are received by the receiving apparatus [2].

The electronic data transmission and reception system according to the present invention further comprises a memory apparatus [3] for use with the transmitting apparatus [1]. The first apparatus [5-1] generates transmission proof data which comprise the first electronic data and the sender authenticator with the signature of the first apparatus [5-1] assigned thereto, and transmits the transmission proof data to the transmitting apparatus [1]. The transmitting apparatus [1] stores the transmission proof data transmitted from the first apparatus into the memory apparatus [3] for use with the transmitting apparatus [1].

With the electronic data transmission and reception system according to the present invention, since the transmission proof data with the signature of the first apparatus [5-1] assigned thereto is stored in the memory apparatus [3] for use with the transmitting apparatus [1], the sender who has transmitted the first electronic document with the transmitting apparatus [1] is unable to repudiate that the sender has transmitted the first electronic document (transmission denial).

In the electronic data transmission and reception system according to the present invention, if the jth apparatus is the first apparatus [5-1], the nth apparatus [5-n] transmits a notification of the reception of nth electronic data to the receiving apparatus [2] when the nth apparatus receives [5-n] the nth electronic data from an (n−1)th apparatus. The receiving apparatus [2] transmits a receiver authenticator which authenticates the reception of the nth electronic data in response to the notification of the reception of nth electronic data. The nth apparatus [5-n] generates (n+1)th electronic data which comprise the nth electronic data and the receiver authenticator with a signature of the nth apparatus [5-n] assigned thereto, and transmits the (n+1)th electronic data to the receiving apparatus [2].

With the electronic data transmission and reception system according to the present invention, because of the sender authenticator and signatures assigned until the (j+1)th electronic data are generated, the sender who has transmitted the first electronic document with the transmitting apparatus [1] is unable to repudiate that the sender has transmitted the first electronic document (transmission denial). With the electronic data transmission and reception system according to the present invention, furthermore, the receiver who uses the receiving apparatus [2] is unable to repudiate that the receiver has received the first electronic document (reception denial). Consequently, the electronic data transmission and reception system according to the present invention guarantees the first electronic data transmitted by the transmitting apparatus [1] until the first electronic data are received by the receiving apparatus [2].

The electronic data transmission and reception system according to the present invention further comprises a memory apparatus [4] for use with the receiving apparatus [2]. The receiving apparatus [2] stores the (n+1)th electronic data transmitted from the nth apparatus [5-n], into the memory apparatus [4] for use with the receiving apparatus [2].

The (n+1)th electronic data comprise the sender authenticator, signatures of the n apparatus [5-1 through 5-n], and the first electronic data to which the receiver authentication is assigned. With electronic data transmission and reception system according to the present invention, inasmuch as the (n+1)th electronic data are stored in the memory apparatus [4], the receiver who uses the receiving apparatus [2] is unable to repudiate that the receiver has received the first electronic document (reception denial).

In the electronic data transmission and reception system according to the present invention, the receiving apparatus [2] comprises a database [18] of the receiving apparatus [2] for storing the sender authenticator and signatures of the n apparatus [5-1 through 5-n]. The receiving apparatus [2] verifies that the transmitting apparatus [2] has transmitted the first electronic data. The receiving apparatus [2] fetches the nth electronic data and the receiver authenticator except the signature of the nth apparatus [5-n] assigned to the (n+1)th electronic data. The receiving apparatus [2] fetches the jth electronic data except the signature assigned to the (j+1)th electronic data other than the (n+1)th electronic data and the second electronic data. The receiving apparatus [2] fetches the first electronic data and the sender authenticator except the signature of the first apparatus [5-1] assigned to the second electronic data. The receiving apparatus [2] refers to the database [18] of the receiving apparatus [2] for recognizing that the transmitting apparatus [1] has transmitted the first electronic data.

If the receiving apparatus [2] properly confirms (verifies) the (n+1)th electronic document, the nth electronic document, . . . , the second electronic document, and the first electronic document in that order, then the electronic data transmission and reception system according to the present invention guarantees that the first electronic document has been transmitted by the transmitting apparatus [1]. Furthermore, the receiving apparatus [2] can verify the route (the transmitting apparatus [1], the n apparatus [5-1 through 5-n], and the receiving apparatus [2]) along which the first electronic document has been transmitted to the receiving apparatus [2], as the historical record of signatures. The sender can confirm the route off-line. The receiving apparatus [2] can confirm off-line the route along which the first electronic document has been transmitted, without the need for communicating with and collecting logs from the n apparatus [5-1 through 5-n]. Therefore, the n apparatus [5-1 through 5-n] are not required to store logs, and do not need any memory apparatus for storing logs. The electronic data transmission and reception system according to the present invention protects itself against illegal access by a hacker as the route is grasped by the receiving apparatus [2].

In the electronic data transmission and reception system according to the present invention, the first apparatus [5-1] generates the second electronic data in which the signature of the first apparatus [5-1] is assigned to a first time stamp that represents the time when the first apparatus [5-1] receives the sender authenticator from the transmitting apparatus [1]. The nth apparatus [5-n] generates the (n+1)th electronic data in which the signature of the nth apparatus [5-n] is assigned to a second time stamp that represents the time when the nth apparatus [5-n] receives the receiver authenticator from the receiving apparatus [2]. The receiving apparatus [2] fetches the nth electronic data, the receiver authenticator, and the second time stamp except the signature of the nth apparatus [5-n] assigned to the (n+1)th electronic data. The receiving apparatus [2] fetches the first electronic data, the sender authenticator, and the first time stamp except the signature of the first apparatus [5-1] assigned to the second electronic data.

In the electronic data transmission and reception system according to the present invention, the nth apparatus [5-n] generates reception proof data which are electronic data comprising the nth electronic data and the receiver authenticator with the signature of the nth apparatus [5-n] assigned thereto.

In the electronic data transmission and reception system according to the present invention, the transmitting apparatus [1] comprises a database [18] of the transmitting apparatus [1] for storing signatures of the n apparatus [5-n] and the receiver authenticator. The transmitting apparatus [1] verifies that the receiving apparatus [2] has received the first electronic data based on the reception proof data from the nth apparatus [5-n].

The transmitting apparatus [1] fetches the nth electronic data and the receiver authenticator except the signature of the nth apparatus [5-n] assigned to the reception proof data. The transmitting apparatus [1] fetches the jth electronic data except the signature assigned to the (j+1)th electronic data other than the reception proof data and the second electronic data. The transmitting apparatus [1] fetches the first electronic data and the sender authenticator except the signature of the first apparatus [5-1] assigned to the second electronic data. The transmitting apparatus [1] refers to the database [18] of the transmitting apparatus [1] for recognizing that the first electronic data have been transmitted to the receiving apparatus [2].

If the transmitting apparatus [1] properly confirms (verifies) the reception proof data, the nth electronic document, . . . , the second electronic document, and the first electronic document in that order, then the electronic data transmission and reception system according to the present invention guarantees that the first electronic document has been received by the receiving apparatus [2]. Furthermore, the transmitting apparatus [1] can verify the route (the transmitting apparatus [1], the n apparatus [5-1 through 5-n], and the receiving apparatus [2]) along which the first electronic document has been transmitted to the receiving apparatus [2], as the historical record of signatures. The sender can confirm the route off-line. The transmitting apparatus [1] can confirm off-line the route along which the first electronic document has been transmitted, without the need for communicating with and collecting logs from the n apparatus [5-1 through 5-n]. Therefore, the n apparatus [5-1 through 5-n] are not required to store logs, and do not need any memory apparatus for storing logs. The electronic data transmission and reception system according to the present invention protects itself against illegal access by a hacker as the route is grasped by the transmitting apparatus [1].

The electronic data transmission and reception system according to the present invention further comprises a first electronic data memory apparatus [3/18]. The first electronic data memory apparatus [3/18] comprises either the memory apparatus [3] for use with the transmitting apparatus [1] or the database [18] of the transmitting apparatus [1]. The transmitting apparatus [1] stores the first electronic data into the first electronic data memory apparatus [3/18] before transmitting the first electronic data. When the transmitting apparatus [1] fetches the first electronic data, the transmitting apparatus [1] refers to the first electronic data memory apparatus [3/18] to recognize that the first electronic data have been transmitted to the receiving apparatus [2] without being falsified.

With the electronic data transmission and reception system according to the present invention, the transmitting apparatus [1] can detect a falsification of the first electronic data by comparing the fetched first electronic data with the first electronic data stored in the first electronic data memory apparatus [3/18].

In the electronic data transmission and reception system according to the present invention, the nth apparatus [5-n] generates reception proof data which are electronic data comprising the nth electronic data and the receiver authenticator with the signature of the nth apparatus [5-n] assigned thereto, and transmits the reception proof data from which the first electronic data have been deleted, to the transmitting apparatus [1]. The transmitting apparatus [1] adds the first electronic data stored in the first electronic data memory apparatus [3/18] to the reception proof data transmitted from the nth apparatus [5-n], thereby restoring the reception proof data.

In the electronic data transmission and reception system according to the present invention, the first apparatus [5-1] generates the second electronic data in which the signature of the first apparatus [5-1] is assigned to a first time stamp that represents the time when the first apparatus [5-1] receives the sender authenticator from the transmitting apparatus [1]. The nth apparatus [5-n] generates the reception proof data in which the signature of the nth apparatus [5-n] is assigned to a second time stamp that represents the time when the nth apparatus [5-n] receives the receiver authenticator from the receiving apparatus [2]. The transmitting apparatus [1] fetches the nth electronic data, the receiver authenticator, and the second time stamp except the signature of the nth apparatus [5-n] assigned to the reception proof data. The transmitting apparatus [1] fetches the first electronic data, the sender authenticator, and the first time stamp except the signature of the first apparatus [5-1] assigned to the second electronic data.

The present invention offers the following advantages:

The electronic data transmission and reception system according to the present invention guarantees the electronic data (the first electronic data) transmitted by transmitting and receiving apparatus 1 (transmitting apparatus 1) until the electronic data (the first electronic data) are received by transmitting and receiving apparatus 2 (receiving apparatus 2).

With the electronic data transmission and reception system according to the present invention, transmitting and receiving apparatus 1 (transmitting apparatus 1) and transmitting and receiving apparatus 2 (receiving apparatus 2) can verify the route along which the electronic data (the first electronic data) are transmitted to transmitting and receiving apparatus 2 (receiving apparatus 2).

With the electronic data transmission and reception system according to the present invention, transmitting and receiving apparatus 1 (transmitting apparatus 1) can detect a falsification of the electronic data (the first electronic data) by comparing the electronic data (the first electronic data) with the electronic data (the first electronic data) that is stored in memory apparatus 3.

The electronic data transmission and reception system according to the present invention protects itself against illegal access by a hacker because the route is grasped by transmitting and receiving apparatus 1 (transmitting apparatus 1) and transmitting and receiving apparatus 2 (receiving apparatus 2).

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
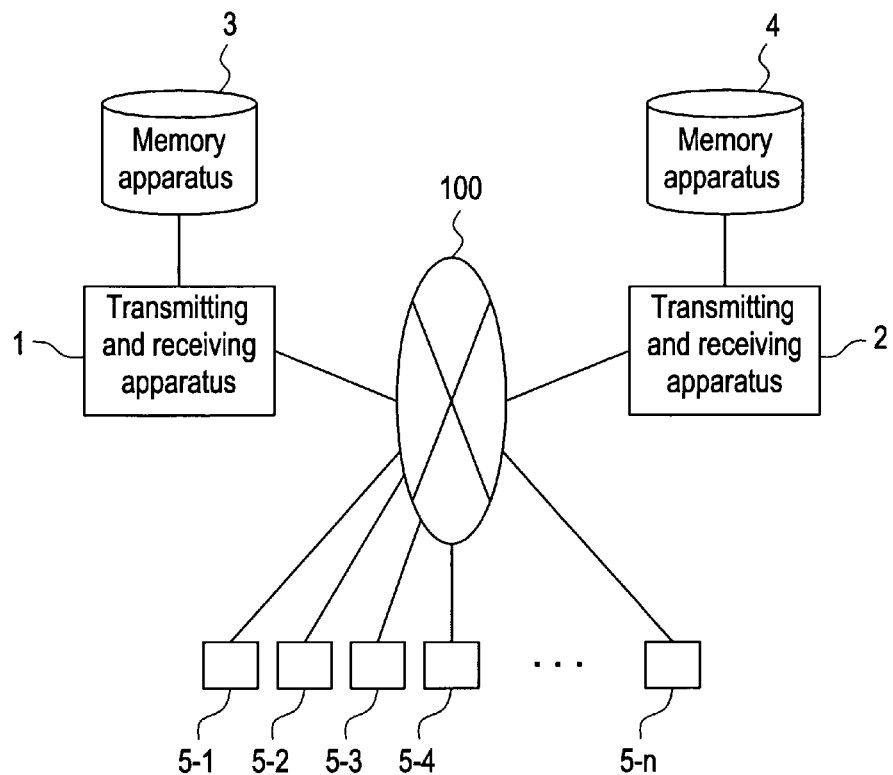
FIG. 1 is a block diagram showing an arrangement of an electronic data transmission and reception system according to the present invention.

FIG. 1 shows in block form an arrangement of an electronic data transmission and reception system according to the present invention. As shown in FIG. 1, the electronic data transmission and reception system according to the present invention comprises transmitting and receiving apparatus 1, 2, memory apparatus 3, memory apparatus 4, and n first through nth (n is an integer of 2 or greater) apparatus 5-1 through 5-n. Transmitting and receiving apparatus 1, 2, first apparatus 5-1, second apparatus 5-2, third apparatus 5-3, fourth apparatus 5-4, . . . , and nth apparatus 5-n are connected to network 100. Memory apparatus 3 is connected as a memory apparatus for transmitting and receiving apparatus 1 to transmitting and receiving apparatus 1. Memory apparatus 4 is connected as a memory apparatus for transmitting and receiving apparatus 2 to transmitting and receiving apparatus 2.

Figure 2:
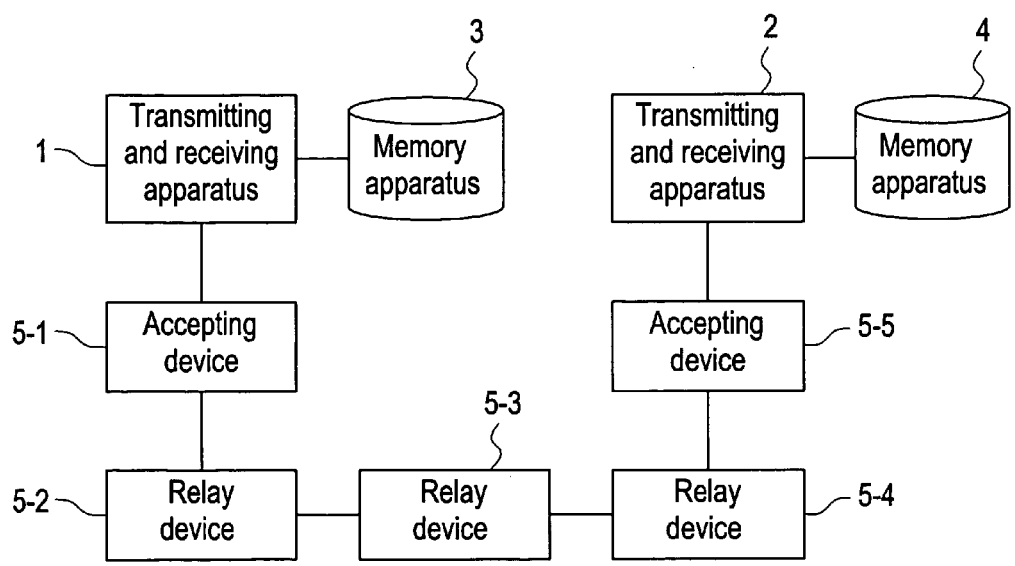
FIG. 2 is a block diagram showing a concept of the electronic data transmission and reception system according to the present invention.

The electronic data transmission and reception system according to the present invention serves to guarantee electronic data transmitted from transmitting and receiving apparatus 1 until they are received by receiving apparatus 2. FIG. 2 shows in block form a concept of the electronic data transmission and reception system according to the present invention. For specifically describing the electronic data transmission and reception system according to the present invention, it is assumed that the integer n is 5, first apparatus 5-1 serves as accepting device 5-1, second apparatus 5-2 as relay device 5-2, third apparatus 5-3 as relay device 5-3, fourth apparatus 5-4 as relay device 5-4, and nth apparatus 5-n as accepting device 5-5. Transmitting and receiving apparatus 1 transmits electronic data to transmitting and receiving apparatus 2. Specifically, the electronic data are output from transmitting and receiving apparatus 1 through accepting device 5-1, relay device 5-2, relay device 5-3, relay device 5-4, and accepting device 5-5 to transmitting and receiving apparatus 2.

The electronic data may, for example, be electronic mail containing a document regarding a business between parties, with an image or images possibly attached to the electronic mail. Alternatively, the electric mail may be financial electronic data or civilian electronic data instead of electronic data regarding a business between parties. The electronic data refers to electronic data (electronic mail) containing a document, and will hereinafter be referred to as an electronic document.

Figure 3:
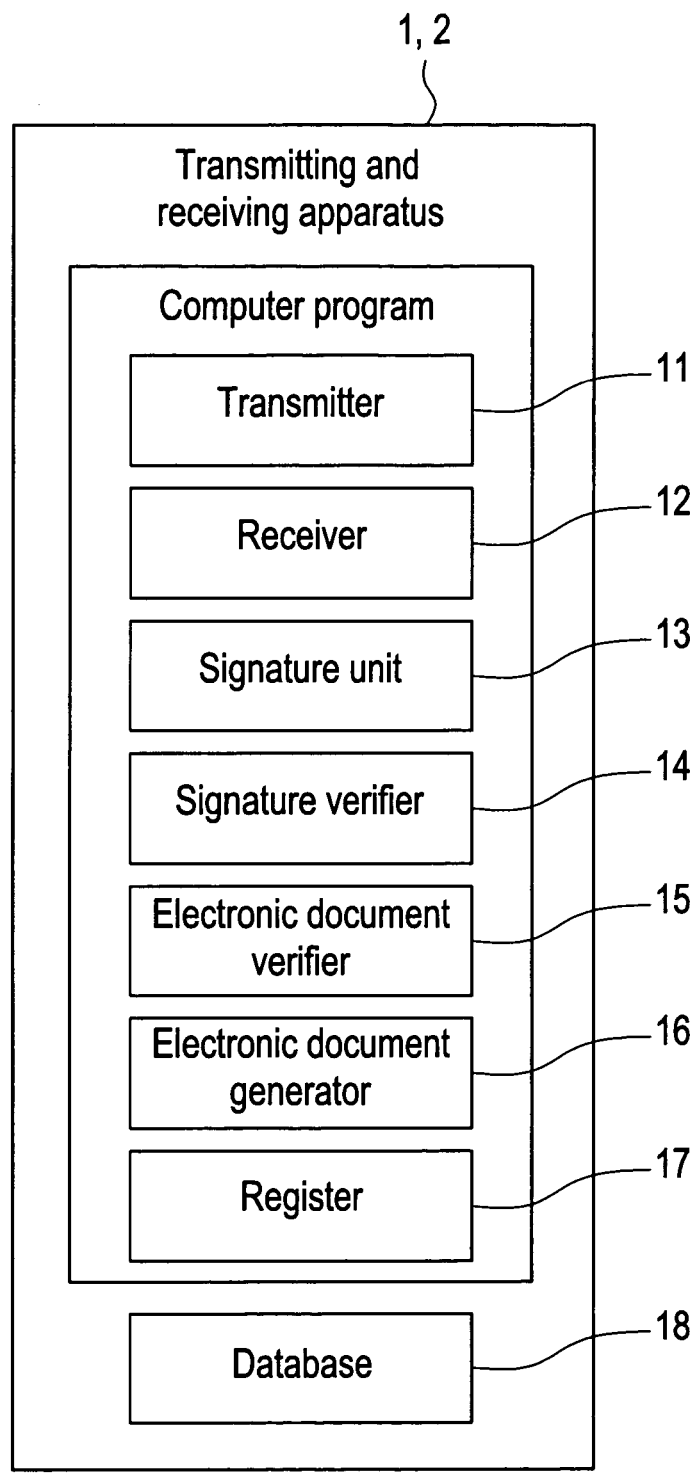
FIG. 3 is a block diagram showing an arrangement of a transmitting and receiving apparatus of the electronic data transmission and reception system according to the present invention.

FIG. 3 shows in block form an arrangement of each of transmitting and receiving apparatus 1, 2. Each of transmitting and receiving apparatus 1, 2 comprises an information processing apparatus exemplified by a personal computer, a workstation, or the like. Each of transmitting and receiving apparatus 1, 2 includes transmitter 11, receiver 12, signature unit 13, signature verifier 14, electronic document verifier 15, electronic document generator 16, and register 17, which are provided by a computer program, and database 18. To each of transmitting and receiving apparatus 1, 2, there is connected an input device (not shown) operable by the user for electronic document generator 16 to generate an electronic document. Signature unit 13 of each of transmitting and receiving apparatus 1, 2 serves to sign transmitting and receiving apparatus 1, 2 on an electronic document with a private key based on a public key system. Database 18 of transmitting and receiving apparatus 1 stores the signatures of accepting devices 5-1, 5-5, the signatures of relay devices 5-2, 5-3, 5-4, and the signature (an authenticator to be described later on) of transmitting and receiving apparatus 2, respectively as public key certificates. Database 18 of transmitting and receiving apparatus 2 stores the signature (an authenticator to be described later on) of transmitting and receiving apparatus 1, the signatures of accepting devices 5-1, 5-5, and the signatures of relay devices 5-2, 5-3, 5-4, respectively as public key certificates.

Figure 4:
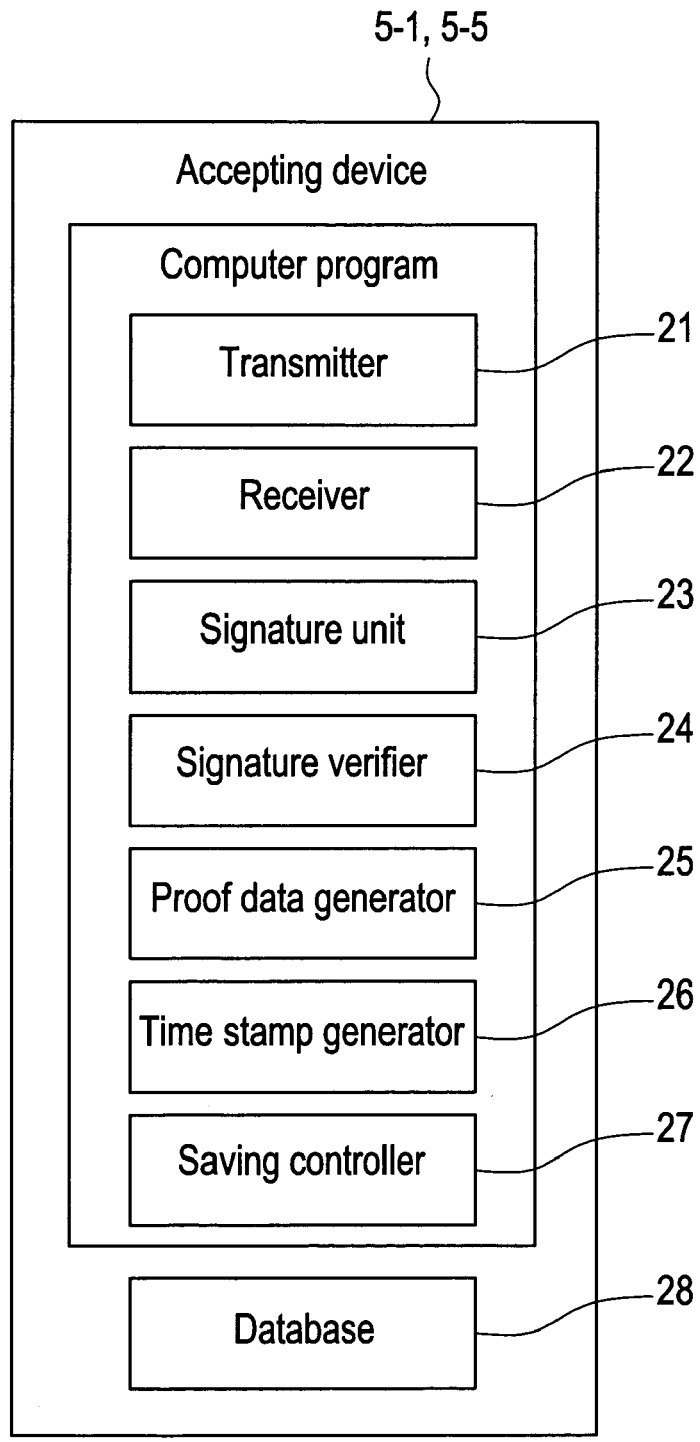
FIG. 4 is a block diagram showing an arrangement of an accepting device of the electronic data transmission and reception system according to the present invention.

FIG. 4 shows in block form an arrangement of each of accepting devices 5-1, 5-5. Each of accepting devices 5-1, 5-5 comprises an information processing apparatus exemplified by a personal computer, a workstation, or the like. Each of accepting devices 5-1, 5-5 includes transmitter 21, receiver 22, signature unit 23, signature verifier 24, proof data generator 25, time stamp generator 26, and saving controller 27, which are provided by a computer program, and database 28. Database 28 of accepting device 5-1 stores the signatures (authenticators to be described later on) of transmitting and receiving apparatus 1, 2, the signatures of relay devices 5-2, 5-3, 5-4, and the signature of accepting device 5-5, respectively as public key certificates. Database 28 of accepting device 5-5 stores the signatures (authenticators to be described later on) of transmitting and receiving apparatus 1, 2, the signature of accepting device 5-1, and the signatures of relay devices 5-2, 5-3, 5-4, respectively as public key certificates. Signature verifiers 24 of accepting devices 5-1, 5-5 recognize, in advance, the addresses of transmitting and receiving apparatus 1, 2. Accepting devices 5-1, 5-5 may be dispensed with, and their functions (transmitter 21, receiver 22, proof data generator 25, time stamp generator 26, signature unit 23, signature verifier 24, saving controller 27, and database 28) may be installed as an application in transmitting and receiving apparatus 1, 2.

Figure 5:
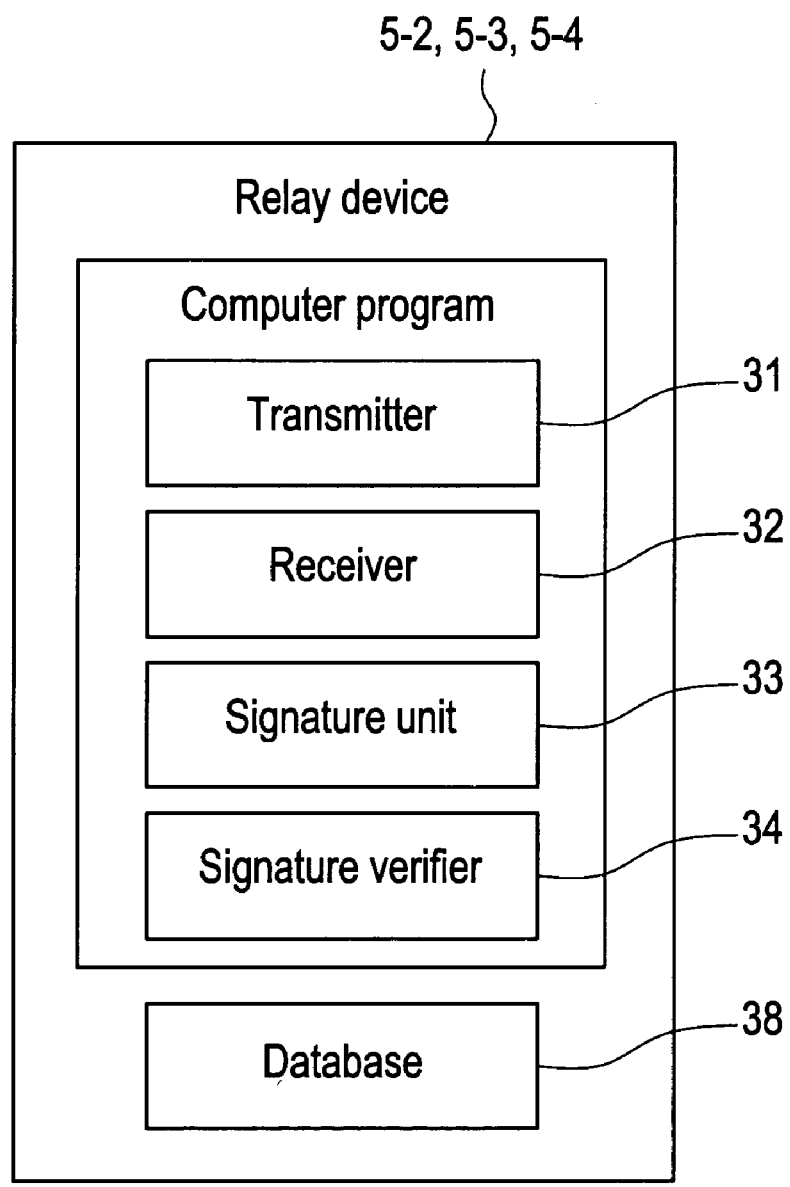
FIG. 5 is a block diagram showing an arrangement of a relay device of the electronic data transmission and reception system according to the present invention.

FIG. 5 shows in block form an arrangement of each of relay devices 5-2, 5-3, 5-4. Each of relay devices 5-2, 5-3, 5-4 includes transmitter 31, receiver 32, signature unit 33, and signature verifier 34, which are provided by a computer program, and database 38. Database 38 of relay device 5-2 stores the signatures of accepting devices 5-1, 5-5 and relay devices 5-3, 5-4, respectively, as public key certificates. Database 38 of relay device 5-3 stores the signatures of accepting devices 5-1, 5-5 and relay devices 5-2, 5-4, respectively, as public key certificates. Database 38 of relay device 5-4 stores the signatures of accepting devices 5-1, 5-5 and relay devices 5-2, 5-3, respectively, as public key certificates. In the present embodiment, three relay devices are employed. However, in an environment where accepting devices 5-1, 5-5 can communicate directly with each other, relay devices 5-2, 5-3, 5-4 are not required. If electronic documents are processed by a long process, then a plurality of relay devices are present in the electronic data transmission and reception system.

Each of memory apparatus 3, 4 comprises, for example, a flexible disk, a hard disk, a database, a file server, or the like. Data (described later on) such as electronic documents, for example, are stored in each of memory apparatus 3, 4 by transmitting and receiving apparatus 1, 2.

Operation of the electronic data transmission and reception system according to the present invention will be described below.

A first electronic document is output from transmitting and receiving apparatus 1 through accepting device 5-1, relay device 5-2, relay device 5-3, relay device 5-4, and accepting device 5-5 to transmitting and receiving apparatus 2. In the description of operation of the electronic data transmission and reception system according to the present invention, transmitting and receiving apparatus 1 is referred to as transmitting apparatus 1, and transmitting and receiving apparatus 2 as receiving apparatus 2.

First, the generation of signature data (signature, transmission authenticator, transmission proof data, reception authenticator, and reception proof data) which serve as proof for the transmission and reception of the first electronic document will be described below.

Figure 6:
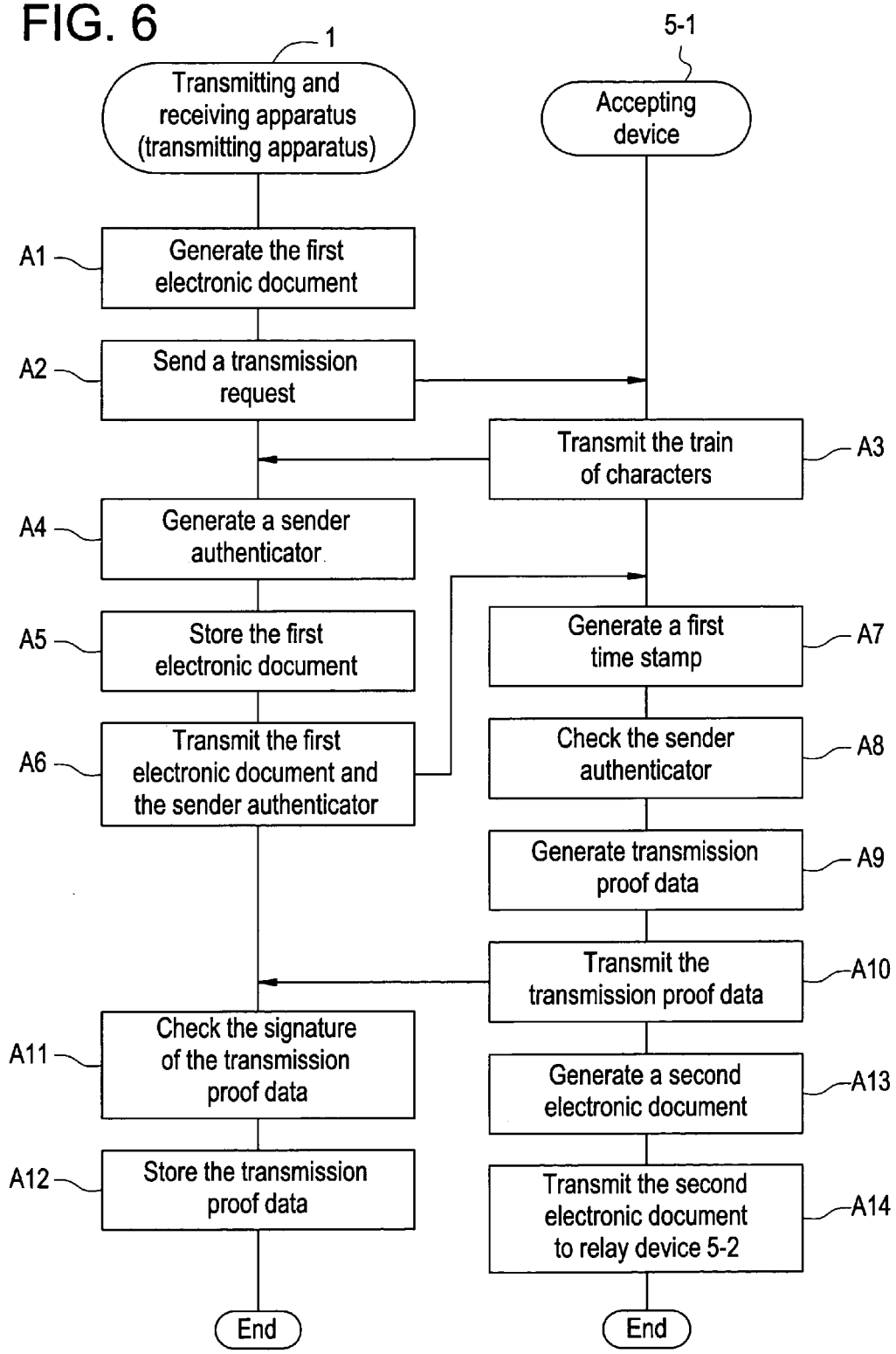
FIG. 6 is a flowchart of an operation sequence of the electronic data transmission and reception system according to the present invention.

As shown in FIG. 6, the sender who uses transmitting apparatus 1 acts on an input device thereof in order to generate the first electronic document to be sent to receiving apparatus 2. In response to the action on the input device, electronic document generator 16 of transmitting apparatus 1 generates the first electronic document (step A1).

When the sender acts on the input device of transmitting apparatus 1 to send the first electronic document to receiving apparatus 2, transmitter 11 of transmitting apparatus 1 sends a transmission request for the first electronic document to accepting device 5-1 in response to the action on the input device (step A2).

Receiver 22 of accepting device 5-1 receives the transmission request for the first electronic document from transmitting apparatus 1. When receiver 22 receives the transmission request for the first electronic document, signature unit 23 of accepting device 5-1 generates a random train of characters. Transmitter 21 of accepting device 5-1 then transmits the generated random train of characters to transmitting apparatus 1 (step A3).

Receiver 12 of transmitting apparatus 1 receives the random train of characters from accepting device 5-1. Signature unit 13 of transmitting apparatus 1 then signs the random train of characters received by receiver 12 with a private key of transmitting apparatus 1, thus generating a sender authenticator which authenticates the transmission of the first electronic document (step A4).

Before transmitter 11 of transmitting apparatus 1 transmits the first electronic document, register 17 of transmitting apparatus 1 stores the first electronic document as a storage electronic document in memory apparatus 3 or database 18 of transmitting apparatus 1 (step A5). In this example, the storage electronic document is stored in memory apparatus 3.

Transmitter 11 of transmitting apparatus 1 then transmits the first electronic document and the sender authenticator to accepting device 5-1 (step A6). The first electronic document contains an address (address of receiving apparatus 2) for sending the first electronic document to receiving apparatus 2.

Receiver 22 of accepting device 5-1 receives the first electronic document and the sender authenticator from transmitting apparatus 1. When receiver 22 receives the first electronic document and the sender authenticator, time stamp generator 26 of accepting device 5-1 generates a first time stamp representative of the time when the sender verifier from transmitting apparatus 1 is received (step A7).

At this time, signature verifier 24 of accepting device 5-1 refers to database 28 of accepting device 5-1, and checks the sender authenticator against the public key certificate of transmitting apparatus 1 to determine whether the sender authenticator matches the public key certificate of transmitting apparatus 1 or not (step A8).

If the sender authenticator matches the public key certificate of transmitting apparatus 1, then proof data generator 25 of accepting device 5-1 adds the sender authenticator and the first time stamp to the first electronic document, generating a hash value. Proof data generator 25 of accepting device 5-1 signs the hash value with the private key of accepting device 5-1, generating transmission proof data which are electronic data comprising the first electronic document, the sender authenticator, and the first time stamp, with the signature of accepting device 5-1 assigned thereto (step A9). For generating such transmission proof data, the first time stamp may be dispensed with. Transmitter 21 of accepting device 5-1 then transmits the transmission proof data to transmitting apparatus 1 (step A10).

If the sender authenticator does not match the public key certificate of transmitting apparatus 1, then transmitter 21 of accepting device 5-1 transmits information indicative of the match failure to transmitting apparatus 1. Based on the information, transmitting apparatus 1 transmits again the first electronic document and the sender authenticator to accepting device 5-1. Accepting device 5-1 checks the sender authenticator again. If the sender authenticator does not match the public key certificate, then accepting device 5-1 transmits information indicating that the first electronic document cannot be transmitted to transmitting apparatus 1 (these steps are not illustrated).

Receiver 12 of transmitting apparatus 1 receives the transmission proof data from accepting device 5-1. When receiver 12 receives the transmission proof data, signature verifier 14 of transmitting apparatus 1 refers to database 18 of transmitting apparatus 1, and checks the signature of the transmission proof data against the public key certificate of accepting device 5-1 to determine whether the signature of the transmission proof data matches the public key certificate of accepting device 5-1 or not (step A11).

If the signature of the transmission proof data matches the public key certificate of accepting device 5-1, then register 17 of transmitting apparatus 1 stores the transmission proof data in memory apparatus 3 (step A12). With the electronic data transmission and reception system according to the present invention, since the transmission proof data with the signature of accepting device 5-1 assigned thereto is stored in memory apparatus 3, the sender who has transmitted the first electronic document with transmitting apparatus 1 is unable to repudiate that the sender has transmitted the first electronic document (transmission denial).

If the signature of the transmission proof data does not match the public key certificate of accepting device 5-1, then transmitting apparatus 1 transmits again the first electronic document and the sender authenticator to accepting device 5-1. Accepting device 5-1 checks the sender authenticator again. If the sender authenticator does not match the public key certificate, then accepting device 5-1 transmits information indicating that the first electronic document cannot be transmitted to transmitting apparatus 1 (these steps are not illustrated).

Signature unit 23 of accepting device 5-1 adds the sender authenticator and the first time stamp to the first electronic document, generating a hash value. Proof data generator 25 of accepting device 5-1 signs the hash value with the private key of accepting device 5-1, generating a second electronic document comprising the first electronic document, the sender authenticator, and the first time stamp, with the signature of accepting device 5-1 assigned thereto (step A13, see FIG. 9). For generating such a second electronic document, the first time stamp may be dispensed with.

Transmitter 21 of accepting device 5-1 then transmits the second electronic document to relay device 5-2 (step A14). The second electronic document contains the address of receiving apparatus 2.

Figure 7:
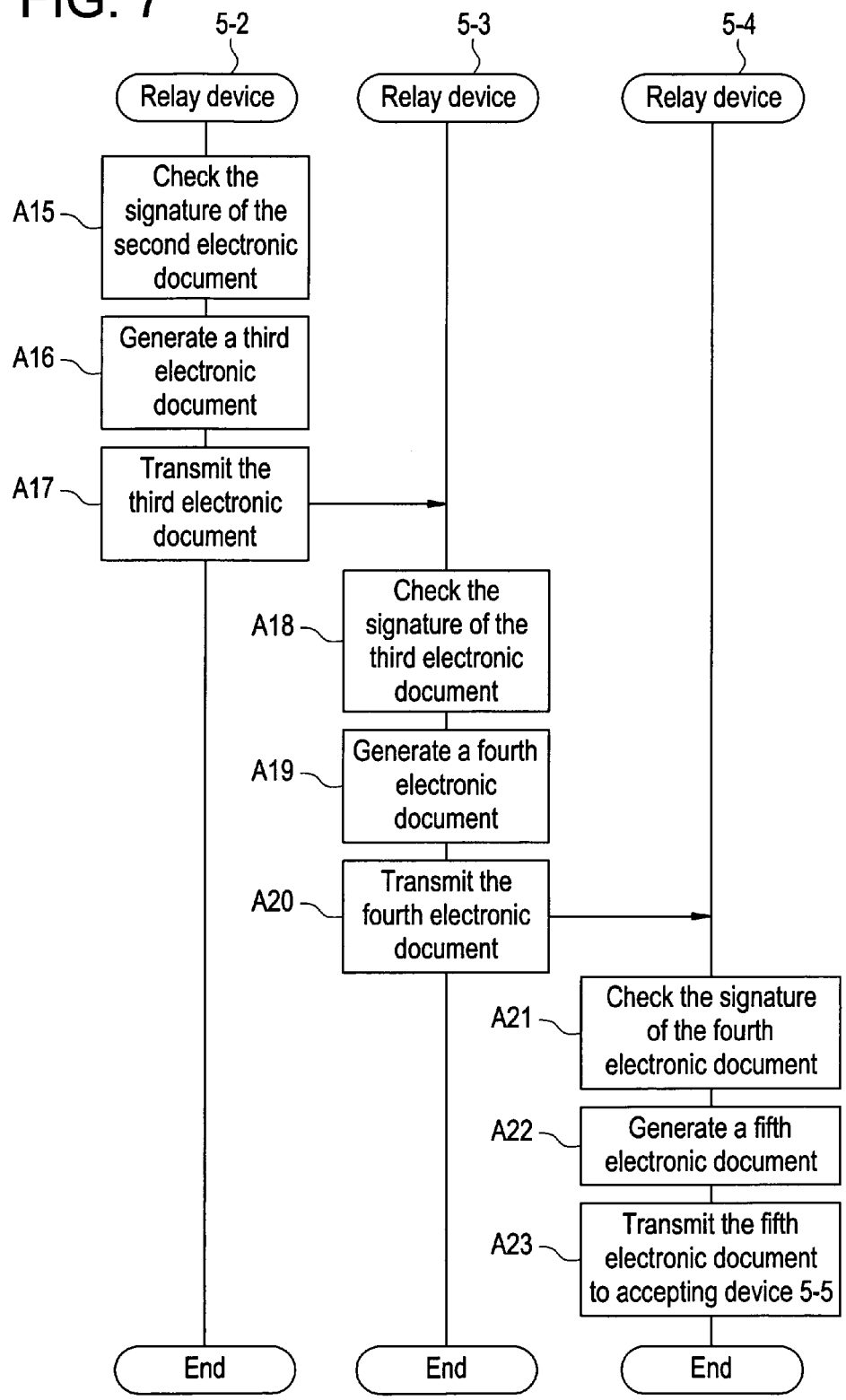
FIG. 7 is a flowchart of an operation sequence of the electronic data transmission and reception system according to the present invention.

As shown in FIG. 7, receiver 32 of relay device 5-2 receives the second electronic document from accepting device 5-1. When receiver 32 receives the second electronic document, signature verifier 34 of relay device 5-2 refers to database 38 of relay device 5-2, and checks the signature of the second electronic document against the public key certificate of accepting device 5-1 to determine whether the signature of the second electronic document matches the public key certificate of accepting device 5-1 or not (step A15). Signature verifier 34 checks the signature of the second electronic document to confirm whether it is alright to relay the second electronic document or not. However, if the relationship between accepting device 5-1 and relay device 5-2 is of mutual confidence, then the signature verification may be dispensed with.

Figure 9:
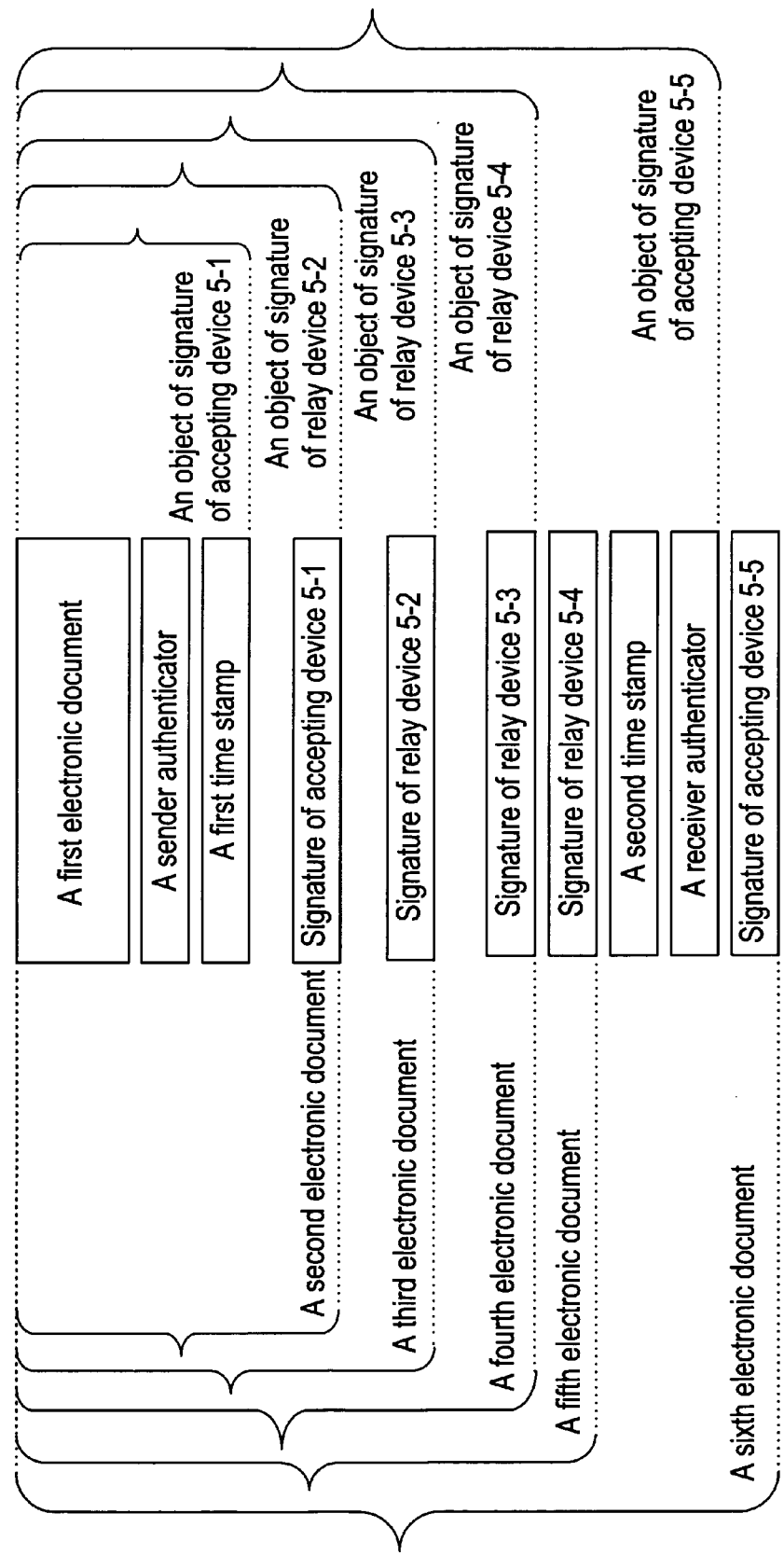
FIG. 9 is a diagram illustrative of an electronic document in the electronic data transmission and reception system according to the present invention.

If the signature of the second electronic document matches the public key certificate of accepting device 5-1, then signature unit 33 of relay device 5-2 signs the second document with the private key of relay device 5-2, generating a third electronic document that comprises the second electronic document with the signature of relay device 5-2 assigned thereto (step A16, see FIG. 9). Transmitter 31 of relay device 5-2 transmits the third electronic document to relay device 5-3 (step A17). The third electronic document contains the address of receiving apparatus 2.

If the signature of the second electronic document does not match the public key certificate of accepting device 5-1, then transmitter 31 of accepting device 5-2 transmits information indicative of the match failure to accepting device 5-1. Based on the information, accepting device 5-1 transmits again the second electronic document to relay device 5-2. Relay device 5-2 checks the signature of the second electronic document again. If the signature of the second electronic document does not match the public key certificate, then relay device 5-2 transmits information indicating that the second electronic document (the first electronic document) cannot be transmitted to transmitting apparatus 1 (these steps are not illustrated).

Receiver 32 of relay device 5-3 receives the third electronic document from accepting device 5-2. When receiver 32 receives the third electronic document, signature verifier 34 of relay device 5-3 refers to database 38 of relay device 5-3, and checks the signature of the third electronic document against the public key certificate of accepting device 5-2 to determine whether the signature of the third electronic document matches the public key certificate of accepting device 5-2 or not (step A18). Signature verifier 34 checks the signature of the third electronic document to confirm whether it is alright to relay the third electronic document or not. However, if the relationship between accepting device 5-2 and relay device 5-3 is of mutual confidence, then the signature verification may be dispensed with.

If the signature of the third electronic document matches the public key certificate of accepting device 5-2, then signature unit 33 of relay device 5-3 signs the third document with the private key of relay device 5-3, generating a fourth electronic document that comprises the third electronic document with the signature of relay device 5-3 assigned thereto (step A19, see FIG. 9). Transmitter 31 of relay device 5-3 transmits the fourth electronic document to relay device 5-4 (step A20). The fourth electronic document contains the address of receiving apparatus 2.

If the signature of the third electronic document does not match the public key certificate of accepting device 5-2, then transmitter 31 of accepting device 5-3 transmits information indicative of the match failure to accepting device 5-2. Based on the information, accepting device 5-2 transmits again the third electronic document to relay device 5-3. Relay device 5-3 checks the signature of the third electronic document again. If the signature of the third electronic document does not match the public key certificate, then relay device 5-3 transmits information indicating that the third electronic document (the first electronic document) cannot be transmitted to transmitting apparatus 1 (these steps are not illustrated).

Receiver 32 of relay device 5-4 receives the fourth electronic document from accepting device 5-3. When receiver 32 receives the fourth electronic document, signature verifier 34 of relay device 5-4 refers to database 38 of relay device 5-4, and checks the signature of the fourth electronic document against the public key certificate of accepting device 5-3 to determine whether the signature of the fourth electronic document matches the public key certificate of accepting device 5-3 or not (step A21). Signature verifier 34 checks the signature of the fourth electronic document to confirm whether it is alright to relay the fourth electronic document or not. However, if the relationship between accepting device 5-3 and relay device 5-4 is of mutual confidence, then the signature verification may be dispensed with.

If the signature of the fourth electronic document matches the public key certificate of accepting device 5-3, then signature unit 33 of relay device 5-4 signs the fourth document with the private key of relay device 5-4, generating a fifth electronic document that comprises the fourth electronic document with the signature of relay device 5-4 assigned thereto (step A22, see FIG. 9). Transmitter 31 of relay device 5-4 transmits the fifth electronic document to relay device 5-5 (step A23). The fifth electronic document contains the address of receiving apparatus 2.

If the signature of the fourth electronic document does not match the public key certificate of accepting device 5-3, then transmitter 31 of accepting device 5-4 transmits information indicative of the match failure to accepting device 5-3. Based on the information, accepting device 5-3 transmits again the fourth electronic document to relay device 5-4. Relay device 5-4 checks the signature of the fourth electronic document again. If the signature of the fourth electronic document does not match the public key certificate, then relay device 5-4 transmits information indicating that the fourth electronic document (the first electronic document) cannot be transmitted to transmitting apparatus 1 (these steps are not illustrated).

Figure 8:
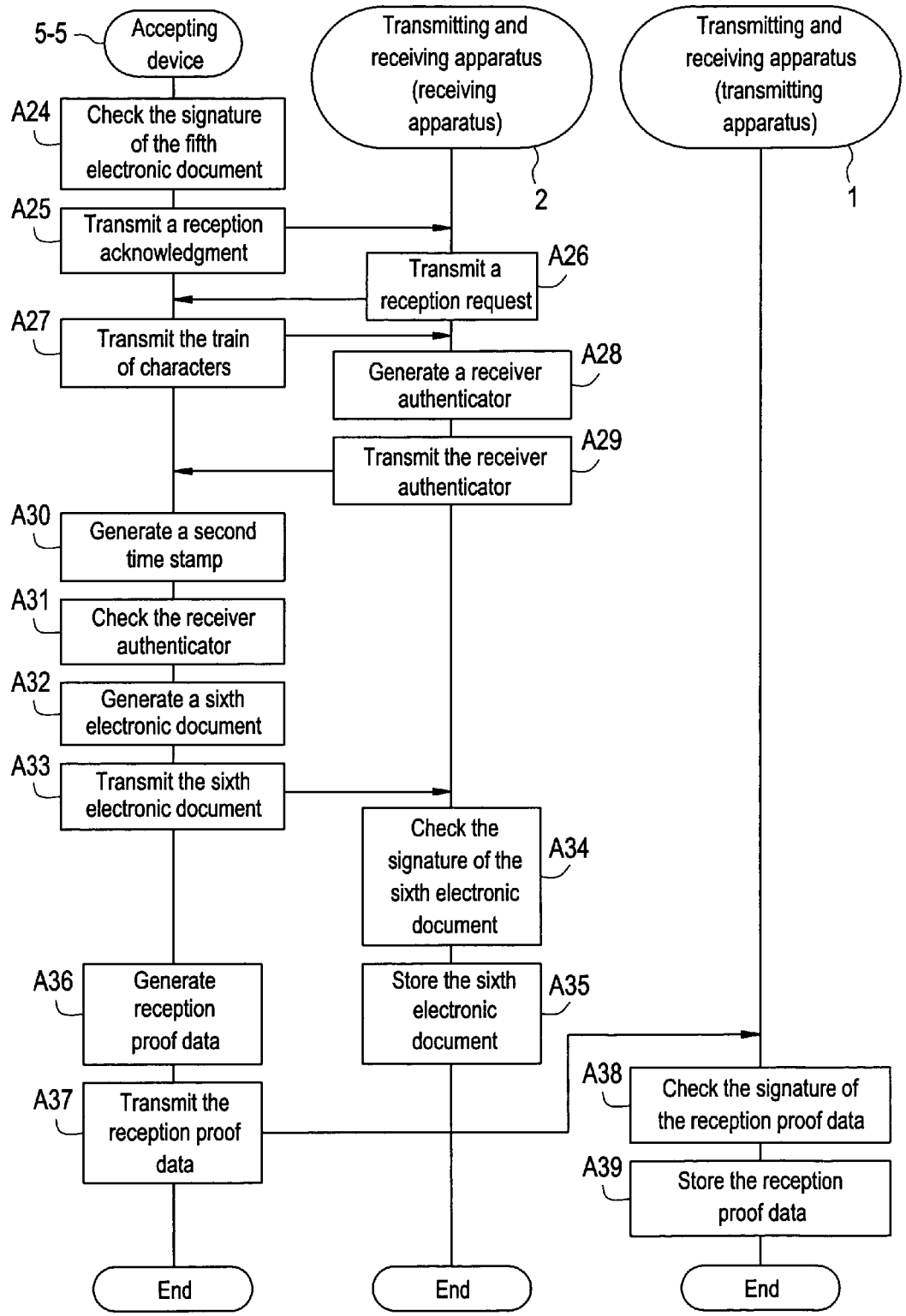
FIG. 8 is a flowchart of an operation sequence of the electronic data transmission and reception system according to the present invention.

As shown in FIG. 8, receiver 22 of accepting device 5-5 receives the fifth electronic document from relay device 5-4. When receiver 32 receives the fifth electronic document, signature verifier 24 of accepting device 5-5 refers to database 28 of accepting device 5-5, and checks the signature of the fifth electronic document against the public key certificate of relay device 5-4 to determine whether the signature of the fifth electronic document matches the public key certificate of relay device 5-4 or not. Signature verifier 24 of accepting device 5-5 refers to database 28 of accepting device 5-5 to confirm whether the fifth electronic document is destined for receiving apparatus 2 or not based on the address contained in the fifth electronic document (step A24).

If the signature of the fifth electronic document matches the public key certificate of relay device 5-4, then transmitter 21 of accepting device 5-5 transmits a reception acknowledgment indicating that the fifth electronic document has been received to receiving apparatus 2 (step A25).

If the signature of the fifth electronic document does not match the public key certificate of relay device 5-4, then transmitter 21 of accepting device 5-5 transmits information indicative of the match failure to relay device 5-4. Based on the information, accepting device 5-4 transmits again the fifth electronic document to accepting device 5-5. Accepting device 5-5 checks the signature of the fifth electronic document again. If the signature of the fifth electronic document does not match the public key certificate, then accepting device 5-5 transmits information indicating that the fifth electronic document (the first electronic document) cannot be transmitted to transmitting apparatus 1 (these steps are not illustrated).

Receiver 12 of receiving apparatus 2 receives the reception acknowledgment from accepting device 5-5. When receiver 12 receives the reception acknowledgment, transmitter 11 of receiving apparatus 2 transmits a reception request for the fifth electronic document to accepting device 5-5 (step A26).

Receiver 22 of accepting device 5-5 receives the reception request for the fifth electronic document from receiving apparatus 2. When receiver 22 receives the reception request for the fifth electronic document, signature unit 23 of accepting device 5-5 generates a random train of characters. Transmitter 21 of accepting device 5-5 then transmits the generated random train of characters to receiving apparatus 2 (step A27).

Receiver 12 of receiving apparatus 2 receives the random train of characters from accepting device 5-5. Signature unit 13 of receiving apparatus 2 then signs the random train of characters received by receiver 12 with a private key of receiving apparatus 2, thus generating a receiver authenticator which authenticates the reception of the fifth electronic document (step A28).

Transmitter 11 of receiving apparatus 2 transmits the receiver authenticator to accepting device 5-5 (step A29).

Receiver 22 of accepting device 5-5 receives the receiver authenticator from receiving apparatus 2. When receiver 22 receives the receiver authenticator, time stamp generator 26 of accepting device 5-5 generates a second time stamp representative of the time when the receiver verifier from receiving apparatus 2 is received (step A30).

At this time, signature verifier 24 of accepting device 5-5 refers to database 28 of accepting device 5-5, and checks the receiver authenticator against the public key certificate of receiving apparatus 2 to determine whether the receiver authenticator matches the public key certificate of receiving apparatus 2 or not (step A31).

If the receiver authenticator matches the public key certificate of receiving apparatus 2, then signature unit 23 of accepting device 5-5 adds the receiver authenticator and the second time stamp to the fifth electronic document, generating a hash value. Signature unit 23 of accepting device 5-5 signs the hash value with the private key of accepting device 5-5, generating a sixth electronic document that comprises the fifth electronic document, the receiver authenticator, and the second time stamp, with the signature of accepting device 5-5 assigned thereto (step A32, see FIG. 9). For generating such a sixth electronic document, the second time stamp may be dispensed with. Transmitter 21 of accepting device 5-5 then transmits the sixth electronic document to receiving apparatus 2 (step A33).

If the receiver authenticator does not match the public key certificate of receiving apparatus 2, then transmitter 21 of accepting device 5-5 transmits information indicative of the match failure to receiving apparatus 2. Based on the information, receiving apparatus 2 transmits again the receiver authenticator to accepting device 5-5. Accepting device 5-5 checks the receiver authenticator again. If the receiver authenticator does not match the public key certificate, then accepting device 5-5 transmits information indicating that the fifth electronic document (the first electronic document) cannot be transmitted to transmitting apparatus 1 (these steps are not illustrated).

Receiver 12 of receiving apparatus 2 receives the sixth electronic document from accepting device 5-5. When receiver 12 receives the sixth electronic document, signature verifier 14 of receiving apparatus 2 refers to database 18 of receiving apparatus 2, and checks the signature of the sixth electronic document against the public key certificate of accepting device 5-5 to determine whether the signature of the sixth electronic document matches the public key certificate of accepting device 5-5 or not (step A34).

If the signature of the sixth electronic document matches the public key certificate of accepting device 5-5, then register 17 of receiving apparatus 2 stores the sixth electronic document in memory apparatus 4 (step A35). The sixth electronic document is the first electronic document to which the sender authenticator, the signatures (accepting device 5-1, relay device 5-2, relay device 5-3, relay device 5-4, and accepting device 5-5), and the receiver authenticator are assigned. With the electronic data transmission and reception system according to the present invention, since the sixth electronic document is stored in memory apparatus 4, the receiver who uses receiving apparatus 2 is unable to repudiate that the receiver has received the first electronic document (reception denial).

If the signature of the sixth electronic document does not match the public key certificate of accepting device 5-5, then transmitter 11 of receiving apparatus 2 transmits information indicative of the match failure to accepting device 5-5. Based on the information, accepting device 5-5 transmits again the sixth electronic document to receiving apparatus 2. Receiving apparatus 2 checks the sixth electronic document again. If the signature of the sixth electronic document does not match the public key certificate, then accepting device 5-5 transmits information indicating that the sixth electronic document (the first electronic document) cannot be transmitted to transmitting apparatus 1 (these steps are not illustrated).

Proof data generator 25 of accepting device 5-5 adds the receiver authenticator and the second time stamp to the fifth electronic document, generating a hash value. Proof data generator 25 of accepting device 5-5 signs the hash value with the private key of accepting device 5-5, generating reception proof data which are electronic data comprising the fifth electronic document, the receiver authenticator, and the second time stamp, with the signature of accepting device 5-5 assigned thereto (step A36, see FIG. 10). For generating such reception proof data, the second time stamp may be dispensed with.

Transmitter 21 of accepting device 5-5 transmits the reception proof data to transmitting apparatus 1 (step A37). The reception proof data are transmitted from accepting device 5-5 through relay device 5-4, relay device 5-3, relay device 5-2, and accepting device 5-1 to transmitting apparatus 1. Alternatively, the reception proof data are directly transmitted from accepting device 5-5 to transmitting apparatus 1.

Receiver 12 of transmitting apparatus 1 receives the reception proof data from accepting device 5-5. When receiver 12 receives the reception proof data, signature verifier 14 of transmitting apparatus 1 refers to database 18 of transmitting apparatus 1, and checks the signature of the reception proof data against the public key certificate of accepting device 5-5 to determine whether the signature of the reception proof data matches the public key certificate of accepting device 5-5 or not (step A38).

If the signature of the reception proof data matches the public key certificate of accepting device 5-5, then register 17 of transmitting apparatus 1 stores the reception proof data in memory apparatus 3 (step A39).

If the signature of the reception proof data does not match the public key certificate of accepting device 5-5, then transmitter 11 of receiving apparatus 2 transmits information indicative of the match failure to accepting device 5-5. Based on the information, accepting device 5-5, transmits again the reception proof data to receiving apparatus 2. Receiving apparatus 2 checks the signature of the reception proof data again. If the signature of the reception proof data does not match the public key certificate, then receiving apparatus 2 transmits information indicating that it will not accept the sixth electronic document (the first electronic document) even when it receives the sixth electronic document, to transmitting apparatus 1 (these steps are not illustrated).

With the electronic data transmission and reception system according to the present invention, because of the sender authenticator, the signatures (accepting device 5-1, relay device 5-2, relay device 5-3, relay device 5-4, and accepting device 5-5) that have been assigned until the sixth electronic document is generated, and the receiver authenticator, the sender who has transmitted the first electronic document using transmitting apparatus 1 is unable to repudiate that the sender has transmitted the first electronic document (transmission denial). Furthermore, the receiver who uses receiving apparatus 2 is unable to repudiate that the receiver has received the first electronic document (reception denial). Therefore, the electronic data transmission and reception system according to the present invention guarantees the first electronic document transmitted from transmitting apparatus 1 until they are received by receiving apparatus 2.

Verification of the sixth electronic document with receiving apparatus 2 will be described below.

Figure 11:
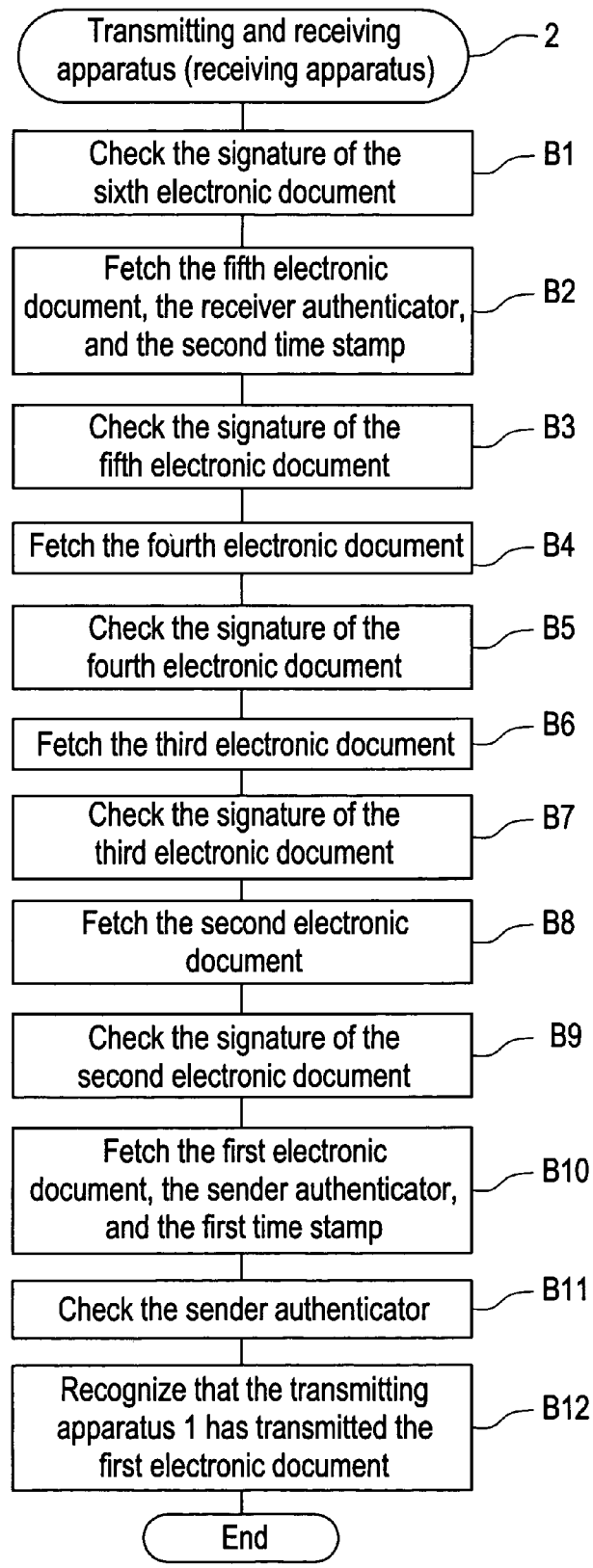
FIG. 11 is a flowchart of an operation sequence of the electronic data transmission and reception system according to the present invention.

As shown in FIG. 11, electronic document verifier 15 of receiving apparatus 2 refers to database 18 of receiving apparatus 2, and checks the signature of the sixth electronic document stored in memory apparatus 4 against the public key certificate of accepting device 5-5 to determine whether the signature of the sixth electronic document matches the public key certificate of accepting device 5-5 or not (step B1).

As a result, electronic document verifier 15 of receiving apparatus 2 fetches the fifth electronic document, the receiver authenticator, and the second time stamp, except the signature of accepting device 5-5 that is assigned to the sixth electronic document which matches the public key certificate of accepting device 5-5 (step B2, see FIG. 9).

Electronic document verifier 15 of receiving apparatus 2 refers to database 18 of receiving apparatus 2, and checks the signature of the fifth electronic document against the public key certificate of accepting device 5-4 to determine whether the signature of the fifth electronic document matches the public key certificate of accepting device 5-4 or not (step B3).

As a result, electronic document verifier 15 of receiving apparatus 2 fetches the fourth electronic document except the signature of accepting device 5-4 that is assigned to the fifth electronic document which matches the public key certificate of accepting device 5-4 (step B4, see FIG. 9).

Electronic document verifier 15 of receiving apparatus 2 refers to database 18 of receiving apparatus 2, and checks the signature of the fourth electronic document against the public key certificate of accepting device 5-3 to determine whether the signature of the fourth electronic document matches the public key certificate of accepting device 5-3 or not (step B5).

Since the signature of the fourth electronic document matches the public key certificate of accepting device 5-3, electronic document verifier 15 of receiving apparatus 2 fetches the third electronic document except the signature of accepting device 5-3 that is assigned to the fourth electronic document (step B6, see FIG. 9).

Electronic document verifier 15 of receiving apparatus 2 refers to database 18 of receiving apparatus 2, and checks the signature of the third electronic document against the public key certificate of accepting device 5-2 to determine whether the signature of the third electronic document matches the public key certificate of accepting device 5-2 or not (step B7).

Since the signature of the third electronic document matches the public key certificate of accepting device 5-2, electronic document verifier 15 of receiving apparatus 2 fetches the second electronic document except the signature of accepting device 5-2 that is assigned to the third electronic document (step B8, see FIG. 9).

Electronic document verifier 15 of receiving apparatus 2 refers to database 18 of receiving apparatus 2, and checks the signature of the second electronic document against the public key certificate of accepting device 5-1 to determine whether the signature of the second electronic document matches the public key certificate of accepting device 5-1 or not (step B9).

Since the signature of the second electronic document matches the public key certificate of accepting device 5-1, electronic document verifier 15 of receiving apparatus 2 fetches the first electronic document, the sender authenticator, and the first time stamp, except the signature of accepting device 5-1 that is assigned to the second electronic document (step B10, see FIG. 9).

Electronic document verifier 15 of receiving apparatus 2 refers to database 18 of receiving apparatus 2, and checks the sender authenticator against the public key certificate of transmitting apparatus 1 to determine whether the sender authenticator matches the public key certificate of transmitting apparatus 1 or not (step B11).

Since the sender authenticator matches the public key certificate of transmitting apparatus 1, electronic document verifier 15 of receiving apparatus 2 recognizes that the transmitting apparatus 1 has transmitted the first electronic document (step B12).

As described above, if receiving apparatus 2 properly confirms (verifies) the sixth electronic document, the fifth electronic document, the fourth electronic document, the third electronic document, the second electronic document, and the first electronic document in that order, then the electronic data transmission and reception system according to the present invention guarantees that the first electronic document has been transmitted by transmitting apparatus 1. Furthermore, receiving apparatus 2 can verify the route (transmitting apparatus 1, accepting device 5-1, relay device 5-2, relay device 5-3, relay device 5-4, accepting device 5-5, and receiving apparatus 2) along which the first electronic document has been transmitted to receiving apparatus 2, as the historical record of signatures. The sender can confirm the route off-line. Receiving apparatus 2 can confirm off-line the route along which the first electronic document has been transmitted, without the need for communicating with and collecting logs from accepting device 5-1, relay device 5-2, relay device 5-3, relay device 5-4, and accepting device 5-5. Therefore, accepting device 5-1, relay device 5-2, relay device 5-3, relay device 5-4, and accepting device 5-5 are not required to store logs, and do not need any memory apparatus for storing logs.

The electronic data transmission and reception system according to the present invention protects itself against illegal access by a hacker as the route is grasped by receiving apparatus 2.

Verification of the reception proof data with transmitting apparatus 1 will be described below.

Figure 12:
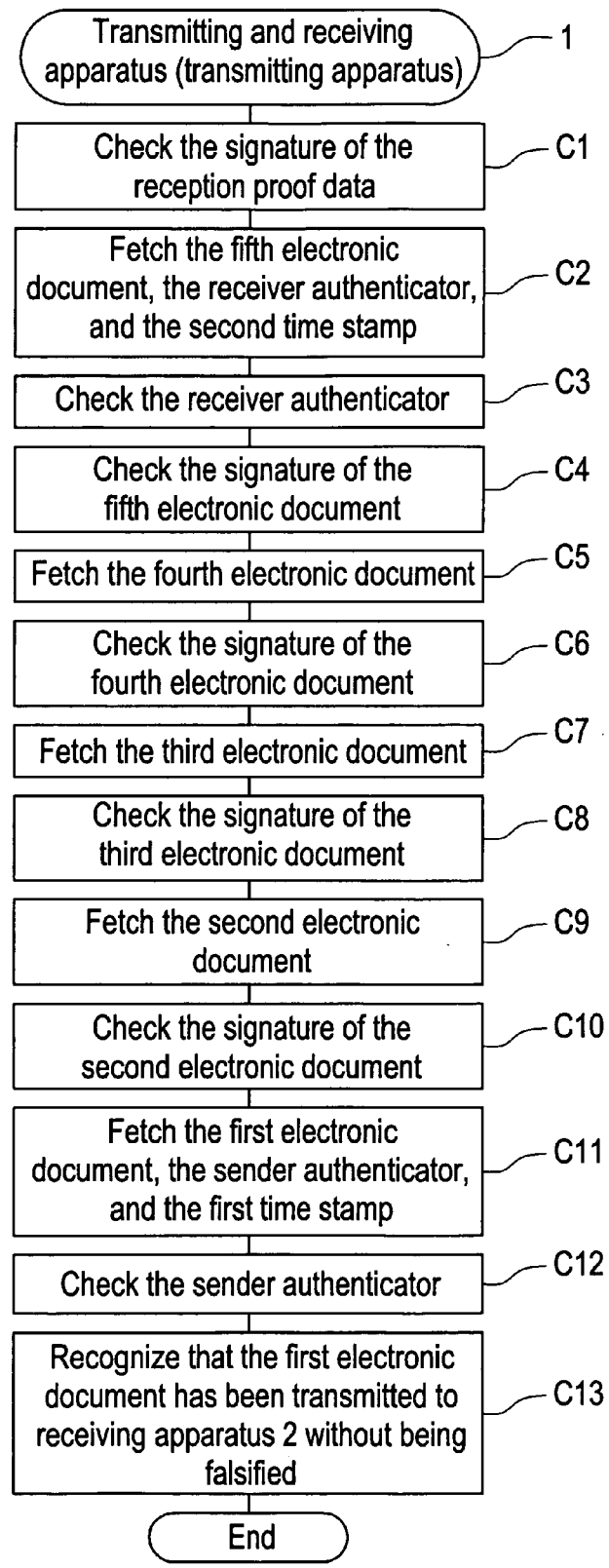
FIG. 12 is a flowchart of an operation sequence of the electronic data transmission and reception system according to the present invention.

As shown in FIG. 12, electronic document verifier 15 of transmitting apparatus 1 refers to database 18 of transmitting apparatus 1, and checks the signature of the reception proof data stored in memory apparatus 3 against the public key certificate of accepting device 5-5 to determine whether the signature of the reception proof data matches the public key certificate of accepting device 5-5 or not (step C1).

Figure 10:
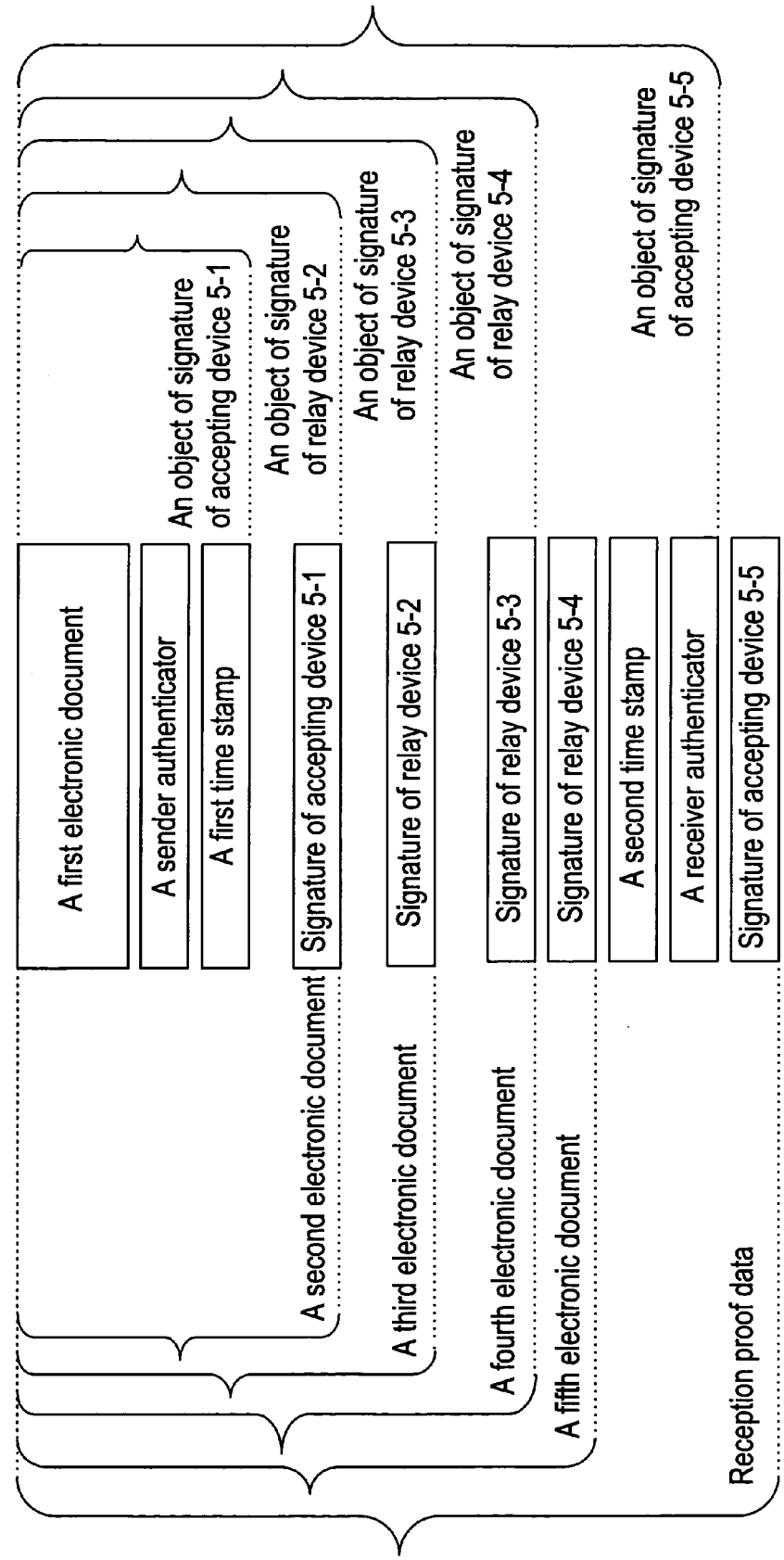
FIG. 10 is a diagram illustrative of an electronic document in the electronic data transmission and reception system according to the present invention.

Since the signature of the reception proof data matches the public key certificate of accepting device 5-5, electronic document verifier 15 of transmitting apparatus 1 fetches the fifth electronic document, the receiver authenticator, and the second time stamp, except the signature of accepting device 5-5 that is assigned to the reception proof data (step C2, see FIG. 10).

Electronic document verifier 15 of transmitting apparatus 1 refers to database 18 of transmitting apparatus 1, and checks the receiver authenticator against the public key certificate of receiving apparatus 2 to determine whether the receiver authenticator matches the public key certificate of receiving apparatus 2 or not (step C3).

Since the receiver authenticator matches the public key certificate of receiving apparatus 2, electronic document verifier 15 of transmitting apparatus 1 refers to database 18 of transmitting apparatus 1, and checks the signature of the fifth electronic document against the public key certificate of accepting device 5-4 to determine whether the signature of the fifth electronic document matches the public key certificate of accepting device 5-4 or not (step C4).

Since the signature of the fifth electronic document matches the public key certificate of accepting device 5-4, electronic document verifier 15 of transmitting apparatus 1 fetches the fourth electronic document except the signature of accepting device 5-4 that is assigned to the fifth electronic document (step C5, see FIG. 10).

Electronic document verifier 15 of transmitting apparatus 1 refers to database 18 of transmitting apparatus 1, and checks the signature of the fourth electronic document against the public key certificate of accepting device 5-3 to determine whether the signature of the fourth electronic document matches the public key certificate of accepting device 5-3 or not (step C6).

Since the signature of the fourth electronic document matches the public key certificate of accepting device 5-3, electronic document verifier 15 of transmitting apparatus 1 fetches the third electronic document except the signature of accepting device 5-3 that is assigned to the fourth electronic document (step C7, see FIG. 10).

Electronic document verifier 15 of transmitting apparatus 1 refers to database 18 of transmitting apparatus 1, and checks the signature of the third electronic document against the public key certificate of accepting device 5-2 to determine whether the signature of the third electronic document matches the public key certificate of accepting device 5-2 or not (step C8).

Since the signature of the third electronic document matches the public key certificate of accepting device 5-2, electronic document verifier 15 of transmitting apparatus 1 fetches the second electronic document except the signature of accepting device 5-2 that is assigned to the third electronic document (step C9, see FIG. 10).

Electronic document verifier 15 of transmitting apparatus 1 refers to database 18 of transmitting apparatus 1, and checks the signature of the second electronic document against the public key certificate of accepting device 5-1 to determine whether the signature of the second electronic document matches the public key certificate of accepting device 5-1 or not (step C10).

Since the signature of the second electronic document matches the public key certificate of accepting device 5-1, electronic document verifier 15 of transmitting apparatus 1 fetches the first electronic document except the signature of accepting device 5-1 that is assigned to the second electronic document (step C11, see FIG. 10).

Electronic document verifier 15 of transmitting apparatus 1 refers to memory apparatus 3, and checks the fetched first electronic document against the storage electronic document (the first electronic document) stored in memory apparatus 3 to determine whether the fetched first electronic document matches the storage electronic document or not (step C12).

Since the fetched first electronic document matches the storage electronic document, electronic document verifier 15 of transmitting apparatus 1 recognizes that the first electronic document has been transmitted to receiving apparatus 2 without being falsified (step C13).

As described above, if transmitting apparatus 1 properly confirms (verifies) the reception proof data, the fifth electronic document, the fourth electronic document, the third electronic document, the second electronic document, and the first electronic document in that order, then the electronic data transmission and reception system according to the present invention guarantees that the first electronic document has been received by receiving apparatus 2. Furthermore, transmitting apparatus 1 can detect a falsification of the first electronic document by comparing the fetched first electronic document with the storage electronic document (the first electronic document) stored in memory apparatus 3. The electronic data transmission and reception system according to the present invention can verify the route (transmitting apparatus 1, accepting device 5-1, relay device 5-2, relay device 5-3, relay device 5-4, accepting device 5-5, and receiving apparatus 2) along which the first electronic document has been transmitted to receiving apparatus 2, as the historical record of signatures. The sender can confirm the route off-line. Transmitting apparatus 1 can confirm off-line the route along which the first electronic document has been transmitted, without the need for communicating with and collecting logs from accepting device 5-1, relay device 5-2, relay device 5-3, relay device 5-4, and accepting device 5-5. Therefore, accepting device 5-1, relay device 5-2, relay device 5-3, relay device 5-4, and accepting device 5-5 are not required to store logs, and do not need any memory apparatus for storing logs. The electronic data transmission and reception system according to the present invention protects itself against illegal access by a hacker as the route is grasped by transmitting apparatus 1.

Figure 14:
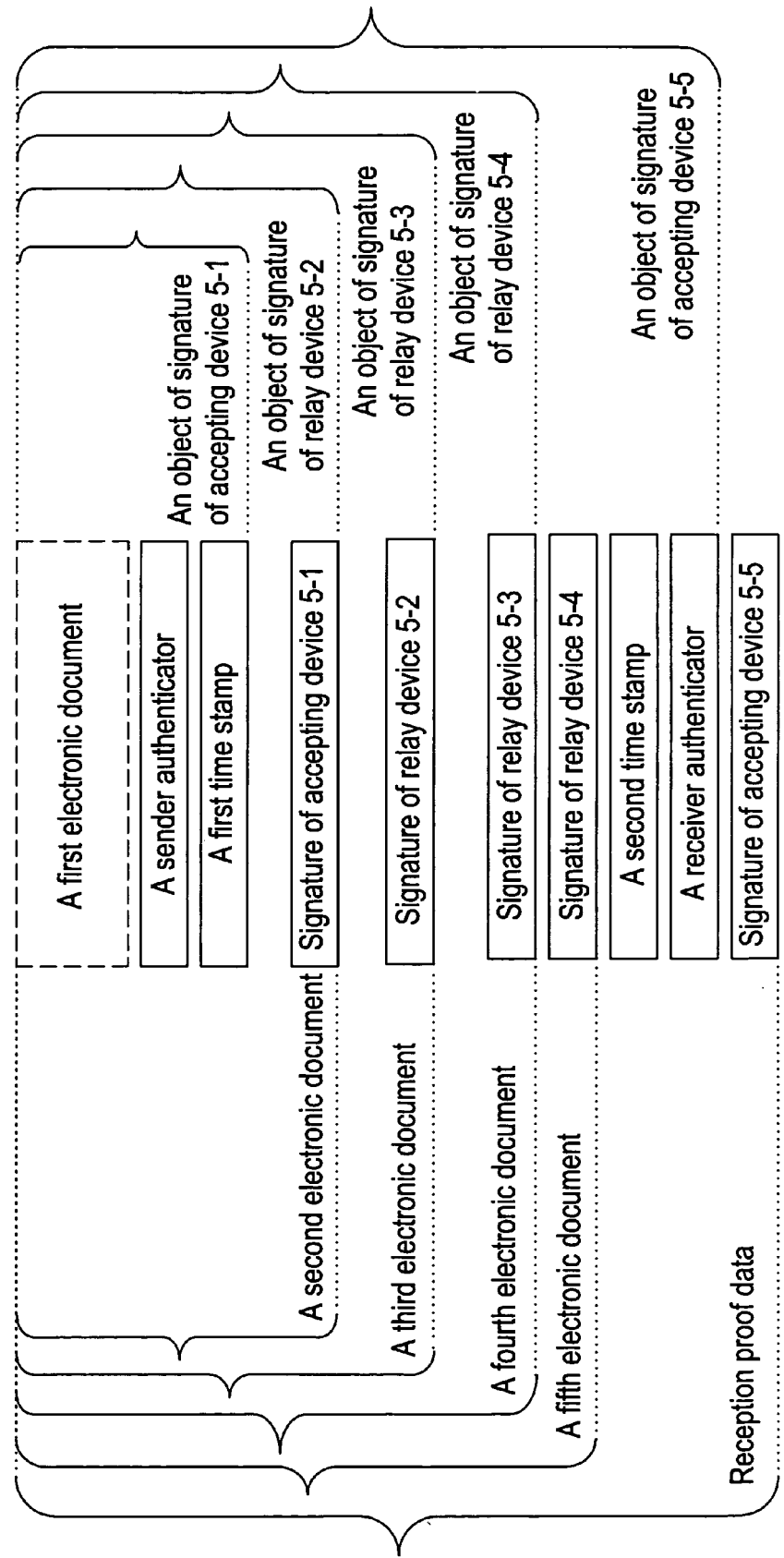
FIG. 14 is a diagram illustrative of an electronic document in the electronic data transmission and reception system according to the present invention.

If reception proof data are generated in step A36, then electronic documents may be dispensed with (see FIG. 14).

Figure 13:
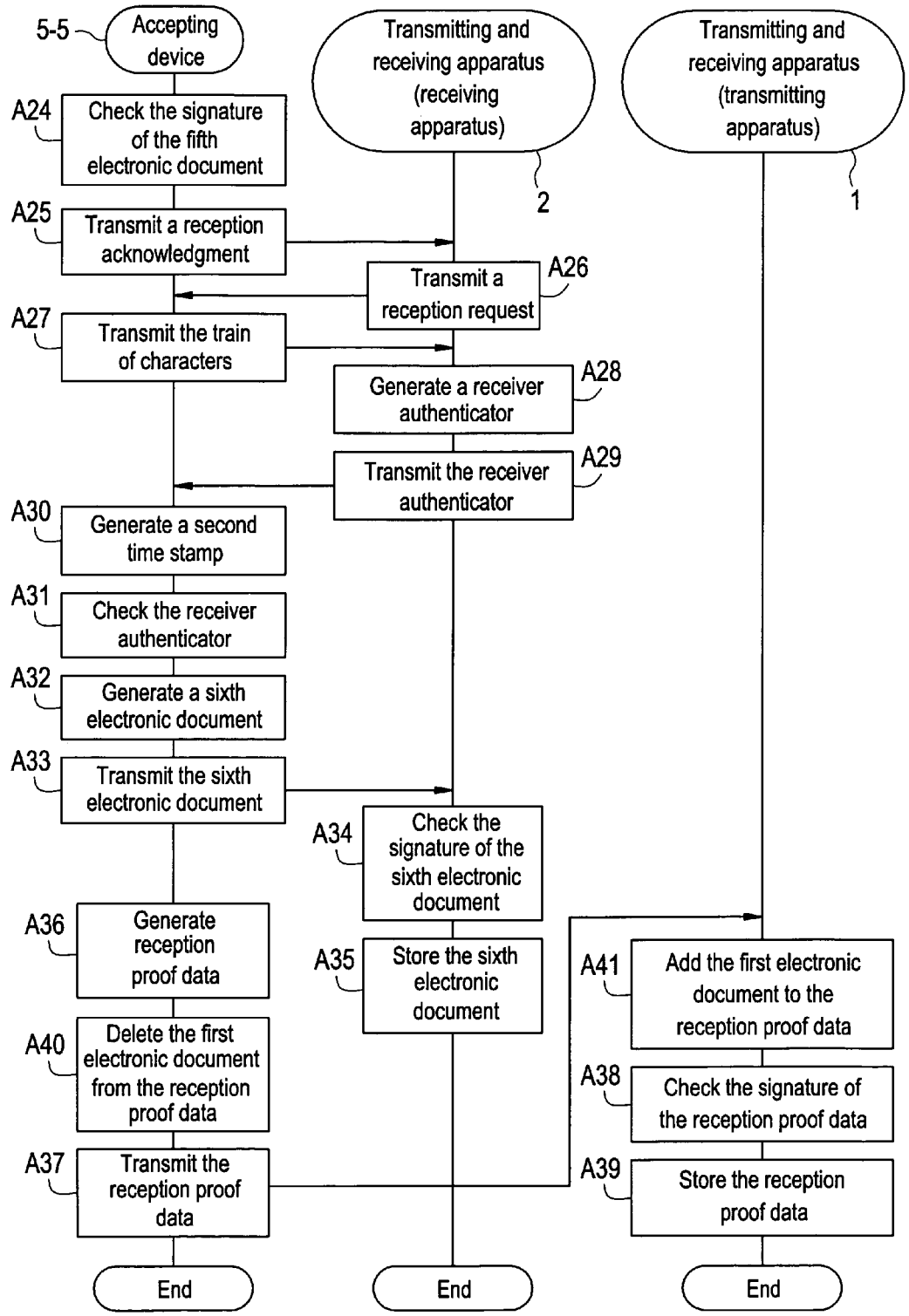
FIG. 13 is a flowchart of an operation sequence of the electronic data transmission and reception system according to the present invention.

Specifically, as shown in FIG. 13, after proof data generator 25 of accepting device 5-5 generates reception proof data in step A36, it deletes the first electronic data from the reception proof data (step A40). Transmitter 21 of accepting device 5-5 transmits the reception proof data from which the first electronic data has been deleted to transmitting apparatus 1 in step A37.

Receiver 12 of transmitting apparatus 1 receives the reception proof data from which the first electronic data has been deleted from accepting device 5-5. At this time, signature verifier 14 of transmitting apparatus 1 adds the storage electronic document (the first electronic document) stored in memory apparatus 3 to the reception proof data from which the first electronic data has been deleted, thus restoring the reception proof data (step A41). Thereafter, transmitting apparatus 1 executes steps A38, A39, C1-C13.

While a preferred embodiment of the present invention has been described using specific terms, such description is for illustrative purposes only, and it is to be understood that changes and variations may be made without departing from the spirit or scope of the following claims.

What is claimed is:

1. An electronic data transmission system for transmitting electronic data from a transmitting apparatus to a receiving apparatus that is different from said transmitting apparatus, said system comprising:
   first through nth apparatuses connected to a network, where n is an integer of 2 or greater;
   a transmitting apparatus connected to said network for transmitting first electronic data to said first apparatus; and
   a receiving apparatus connected to said network for receiving (n+1)th electronic data from said nth apparatus,
   wherein a jth apparatus transmits a notification of a reception of nth electronic data to said receiving apparatus when said nth apparatus receives said nth electronic data from a (j−1)th apparatus, j being between 1 to n,
   said receiving apparatus transmits a receiver authenticator to said jth apparatus, which authenticates the reception of said notification from said jth apparatus, and
   said jth apparatus generates (j+1)th electronic data which comprise said nth electronic data and said receiver authenticator with a signature of the nth apparatus assigned thereto, and transmits said (j+1)th electronic data to a (j+1)th apparatus.

2. An electronic data transmission and reception system according to claim 1, wherein said transmitting apparatus transmits said first electronic data and a sender authenticator which authenticates a transmission of said first electronic data, to said first apparatus; and
   said first apparatus generates second electronic data which comprise said first electronic data and said sender authenticator with a signature of said first apparatus assigned thereto, and transmits said second electronic data to a second apparatus.

3. An electronic data transmission and reception system according to claim 2, further comprising:
   a memory apparatus for use with said transmitting apparatus;
   wherein said first apparatus generates transmission proof data which comprise said first electronic data and said sender authenticator with the signature of said first apparatus assigned thereto, and transmits said transmission proof data to said transmitting apparatus; and
   said transmitting apparatus stores the transmission proof data transmitted from said first apparatus into said memory apparatus for use with said transmitting apparatus.

4. An electronic data transmission and reception system according to claim 3, wherein said nth apparatus transmits a notification of a reception of nth electronic data to said receiving apparatus when said nth apparatus receives said nth electronic data from an (n−1)th apparatus;
   said receiving apparatus transmits a receiver authenticator which authenticates the reception of said nth electronic data in response to the notification of the reception of nth electronic data; and
   said nth apparatus generates (n+1)th electronic data which comprise said nth electronic data and said receiver authenticator with a signature of the nth apparatus assigned thereto, and transmits said (n+1)th electronic data to said receiving apparatus.

5. An electronic data transmission and reception system according to claim 4, further comprising:
   a memory apparatus for use with said receiving apparatus;
   wherein said receiving apparatus stores said (n+1)th electronic data transmitted from said nth apparatus, into said memory apparatus for use with said receiving apparatus.

6. An electronic data transmission and reception system according to claim 2, further comprising:
   a memory apparatus for use with said receiving apparatus;
   wherein said receiving apparatus stores said (n+1)th electronic data transmitted from said nth apparatus, into said memory apparatus for use with said receiving apparatus.

7. An electronic data transmission and reception system according to claim 6, wherein said receiving apparatus comprises:
   a database of said receiving apparatus for storing said sender authenticator and signatures of said n apparatus; and
   wherein said receiving apparatus:
   fetches said nth electronic data and said receiver authenticator except the signature of said nth apparatus assigned to said (n+1)th electronic data;
   fetches said jth electronic data except the signature assigned to said (j+1)th electronic data other than said (n+1)th electronic data and said second electronic data;
   fetches said first electronic data and said sender authenticator except the signature of said first apparatus assigned to said second electronic data; and
   refers to said database of said receiving apparatus for recognizing that said transmitting apparatus has transmitted said first electronic data.

8. An electronic data transmission and reception system according to claim 7, wherein said first apparatus generates said second electronic data in which the signature of said first apparatus is assigned to a first time stamp that represents the time when said first apparatus receives said sender authenticator from said transmitting apparatus;
   said nth apparatus generates said (n+1)th electronic data in which the signature of said nth apparatus is assigned to a second time stamp that represents the time when said nth apparatus receives said receiver authenticator from said receiving apparatus; and
   wherein said receiving apparatus fetches said nth electronic data, said receiver authenticator, and said second time stamp except the signature of said nth apparatus assigned to said (n+1)th electronic data; and
   fetches said first electronic data, said sender authenticator, and said first time stamp except the signature of said first apparatus assigned to said second electronic data.

9. An electronic data transmission and reception system according to claim 2, wherein said receiving apparatus comprises:
   a database of said receiving apparatus for storing said sender authenticator and signatures of said n apparatus; and
   wherein said receiving apparatus:
   fetches said nth electronic data and said receiver authenticator except the signature of said nth apparatus assigned to said (n+1)th electronic data;
   fetches jth electronic data except the signature assigned to said (j+1)th electronic data other than said (n+1)th electronic data and said second electronic data;

fetches said first electronic data and said sender authenticator except the signature of said first apparatus assigned to said second electronic data; and refers to said database of said receiving apparatus for recognizing that said transmitting apparatus has transmitted said first electronic data.

10. An electronic data transmission and reception system according to claim 9, wherein said first apparatus generates said second electronic data in which the signature of said first apparatus is assigned to a first time stamp that represents the time when said first apparatus receives said sender authenticator from said transmitting apparatus;

said nth apparatus generates said (n+1)th electronic data in which the signature of said nth apparatus is assigned to a second time stamp that represents the time when said nth apparatus receives said receiver authenticator from said receiving apparatus; and wherein said receiving apparatus fetches said nth electronic data, said receiver authenticator, and said second time stamp except the signature of said nth apparatus assigned to said (n+1)th electronic data; and fetches said first electronic data, said sender authenticator, and said first time stamp except the signature of said first apparatus assigned to said second electronic data.

11. An electronic data transmission and reception system according to claim 2, wherein said nth apparatus generates reception proof data which are electronic data comprising said nth electronic data and said receiver authenticator with the signature of said nth apparatus assigned thereto.

12. An electronic data transmission and reception system according to claim 11, wherein said transmit-ting apparatus comprises:

a database of said transmitting apparatus for storing signatures of said n apparatus and said receiver authenticator; and wherein said transmitting apparatus:

fetches said nth electronic data and said receiver authenticator except the signature of said nth apparatus assigned to said reception proof data;

fetches said jth electronic data except the signature assigned to said (j+1)th electronic data other than said reception proof data and said second electronic data;

fetches said first electronic data and said sender authenticator except the signature of said first apparatus assigned to said second electronic data; and refers to said database of said transmitting apparatus for recognizing that said first electronic data have been transmitted to said receiving apparatus.

13. An electronic data transmission and reception system according to claim 12, further comprising:

a first electronic data memory apparatus;

wherein said transmitting apparatus:

stores said first electronic data into said first electronic data memory apparatus before transmitting said first electronic data; and when said transmitting apparatus fetches said first electronic data, said transmitting apparatus refers to said first electronic data memory apparatus to recognize that said first electronic data have been transmitted to said receiving apparatus without being falsified.

14. An electronic data transmission and reception system according to claim 13, wherein said nth apparatus generates reception proof data which are electronic data comprising said nth electronic data and said receiver authenticator with the signature of said nth apparatus assigned thereto, and transmits said reception proof data from which said first electronic data have been deleted, to said transmitting apparatus; and wherein said transmitting apparatus adds said first electronic data stored in said first electronic data memory apparatus to said reception proof data transmitted from said nth apparatus, thereby restoring said reception proof data.

15. An electronic data transmission and reception system according to claim 14, wherein said first apparatus generates said second electronic data in which the signature of said first apparatus is assigned to a first time stamp that represents a time when said first apparatus receives said Sender authenticator from said transmit-ting apparatus;

said nth apparatus generates said reception proof data in which the signature of said nth apparatus is assigned to a second time stamp that represents a time when said nth apparatus receives said receiver authenticator from said receiving apparatus; and wherein said transmitting apparatus:

fetches said nth electronic data, said receiver authenticator, and said second time stamp except the signature of said nth apparatus assigned to said reception proof data; and fetches said first electronic data, said sender authenticator, and said first time stamp except the signature of said first apparatus assigned to said second electronic data.

16. An electronic data transmission and reception system according to claim 12, wherein said first apparatus generates said second electronic data in which the signature of said first apparatus is assigned to a first time stamp that represents a time when said first apparatus receives said sender authenticator from said transmitting apparatus;

said nth apparatus generates said reception proof data in which the signature of said nth apparatus is assigned to a second time stamp that represents a time when said nth apparatus receives said receiver authenticator from said receiving apparatus; and wherein said transmitting apparatus:

fetches said nth electronic data, said receiver authenticator, and said second time stamp except the signature of said nth apparatus assigned to said reception proof data; and fetches said first electronic data, said sender authenticator, and said first time stamp except the signature of said first apparatus assigned to said second electronic data.

17. An electronic data transmission and reception method for transmitting electronic data from a transmitting apparatus to a receiving apparatus that is different from said transmitting apparatus, said method comprising:

connecting first through nth apparatuses to a network, where n is an integer of 2 or greater;

transmitting from a transmitting apparatus connected to said network first electronic data to said first apparatus;

receiving with a receiving apparatus connected to said network (n+1)th electronic data from said nth apparatus;

transmitting a notification of a reception of nth electronic data from a jth apparatus to said receiving apparatus when said nth apparatus receives said nth electronic data from a (j−1)th apparatus, j being between 1 to n;

transmitting a receiver authenticator to said jth apparatus, which authenticates the reception of said notification from said jth apparatus; and generating with the jth apparatus (j+1)th electronic data which comprise said nth electronic data and said receiver authenticator with a signature of the nth apparatus assigned thereto, and transmitting said (j+1)th electronic data to a (j+1)th apparatus.

18. The electronic data transmission and reception method according to claim 17, wherein said first electronic data further comprises a sender authenticator which authenticates the transmission of said first electronic data.

19. The electronic data transmission and reception method according to claim 18, further comprising:
- generating transmission proof data comprising said first electronic data and said sender authenticator with the signature of said first apparatus assigned thereto, and transmitting said transmission proof data to said transmitting apparatus; and
- storing the transmission proof data transmitted from said first apparatus in a memory apparatus for use with said transmitting apparatus.

20. An electronic data transmission and reception method according to claim 19, further comprising:
- transmitting a notification of a reception of nth electronic data to said receiving apparatus when said nth apparatus receives said nth electronic data from an (n−1)th apparatus;
- transmitting a receiver authenticator which authenticates the reception of said nth electronic data from the receiving apparatus in response to the notification of the reception of nth electronic data; and
- generating with said nth apparatus (n+1)th electronic data which comprise said nth electronic data and said receiver authenticator with a signature of the nth apparatus assigned thereto, and transmitting said (n+1)th electronic data to said receiving apparatus.

21. The electronic data transmission and reception method according to claim 18, further comprising:
- storing said sender authenticator and signatures of said n apparatuses in a database of said receiving apparatus;
- fetching said nth electronic data and said receiver authenticator except the signature of said nth apparatus assigned to said (n+1)th electronic data;
- fetching said jth electronic data except the signature assigned to said (j+1)th electronic data other than said (n+1)th electronic data and said second electronic data;
- fetching said first electronic data and said sender authenticator except the signature of said first apparatus assigned to said second electronic data; and
- referring to said database of said receiving apparatus for recognizing that said transmitting apparatus has transmitted said first electronic data.

22. An electronic data transmission and reception method according to claim 18, further comprising:
- generating from said first apparatus second electronic data in which the signature of said first apparatus is assigned to a first time stamp that represents the time when said first apparatus receives said sender authenticator from said transmitting apparatus;
- generating from said nth apparatus said (n+1)th electronic data in which the signature of said nth apparatus is assigned to a second time stamp that represents the time when said nth apparatus receives said receiver authenticator from said receiving apparatus.

23. The electronic data transmission and reception method according to claim 18, further comprising:
- storing signatures of said n apparatuses and said receiver authenticator in a database of said transmitting apparatus;
- fetching said nth electronic data and said receiver authenticator except the signature of said nth apparatus assigned to said reception proof data;
- fetching jth electronic data except the signature assigned to said (j+1)th electronic data other than said reception proof data and said second electronic data;
- fetching said first electronic data and said sender authenticator except the signature of said first apparatus assigned to said second electronic data; and
- referring to said database of said transmitting apparatus for recognizing that said first electronic data have been transmitted to said receiving apparatus.

24. The electronic data transmission and reception method according to claim 23, further comprising:
- storing said first electronic data in a first electronic data memory apparatus of said transmitting apparatus before transmitting said first electronic data; and
- referring to said first electronic data memory apparatus to recognize that said first electronic data have been transmitted to said receiving apparatus without being falsified when said transmitting apparatus fetches said first electronic data.

25. The electronic data transmission and reception method according to claim 24, further comprising:
- generating from said nth apparatus reception proof data which are electronic data comprising said nth electronic data and said receiver authenticator with the signature of said nth apparatus assigned thereto, and transmitting said reception proof data from which said first electronic data have been deleted, to said transmitting apparatus; and
- adding in said transmitting apparatus said first electronic data stored in said first electronic data memory apparatus to said reception proof data transmitted from said nth apparatus, thereby restoring said reception proof data.

* * * * *